United States Patent [19]
Wells

[11] 3,947,819

[45] Mar. 30, 1976

[54] APPARATUS FOR EXPANDING CHANNEL OUTPUT CAPACITY

[75] Inventor: William R. Wells, Linwood, N.J.

[73] Assignee: United Audio Visual Corporation, Las Vegas, Nev.

[22] Filed: Dec. 31, 1974

[21] Appl. No.: 537,724

[52] U.S. Cl............................ 340/147 P; 340/147 C
[51] Int. Cl.² ........................................ H04Q 5/00
[58] Field of Search......... 340/147 P, 147 C, 147 R, 340/166 R

[56] References Cited
UNITED STATES PATENTS
3,278,812  10/1966  Johnson........................... 340/147 P Primary Examiner—Harold I. Pitts
Attorney, Agent, or Firm—Seidel, Gonda, Goldhammer

[57] ABSTRACT

A plurality of channel expander devices is operated in response to the channel outputs of a programmer. Means are provided for detecting information in the output channels of the programmer. The programmer output channel information is stored in a first storage means. The channel expander devices are energized one at a time in response to the stored information. A reset signal is generated in response to predetermined information in the programmer output channels, and the first storage means are reset in response to the reset signal.

20 Claims, 8 Drawing Figures

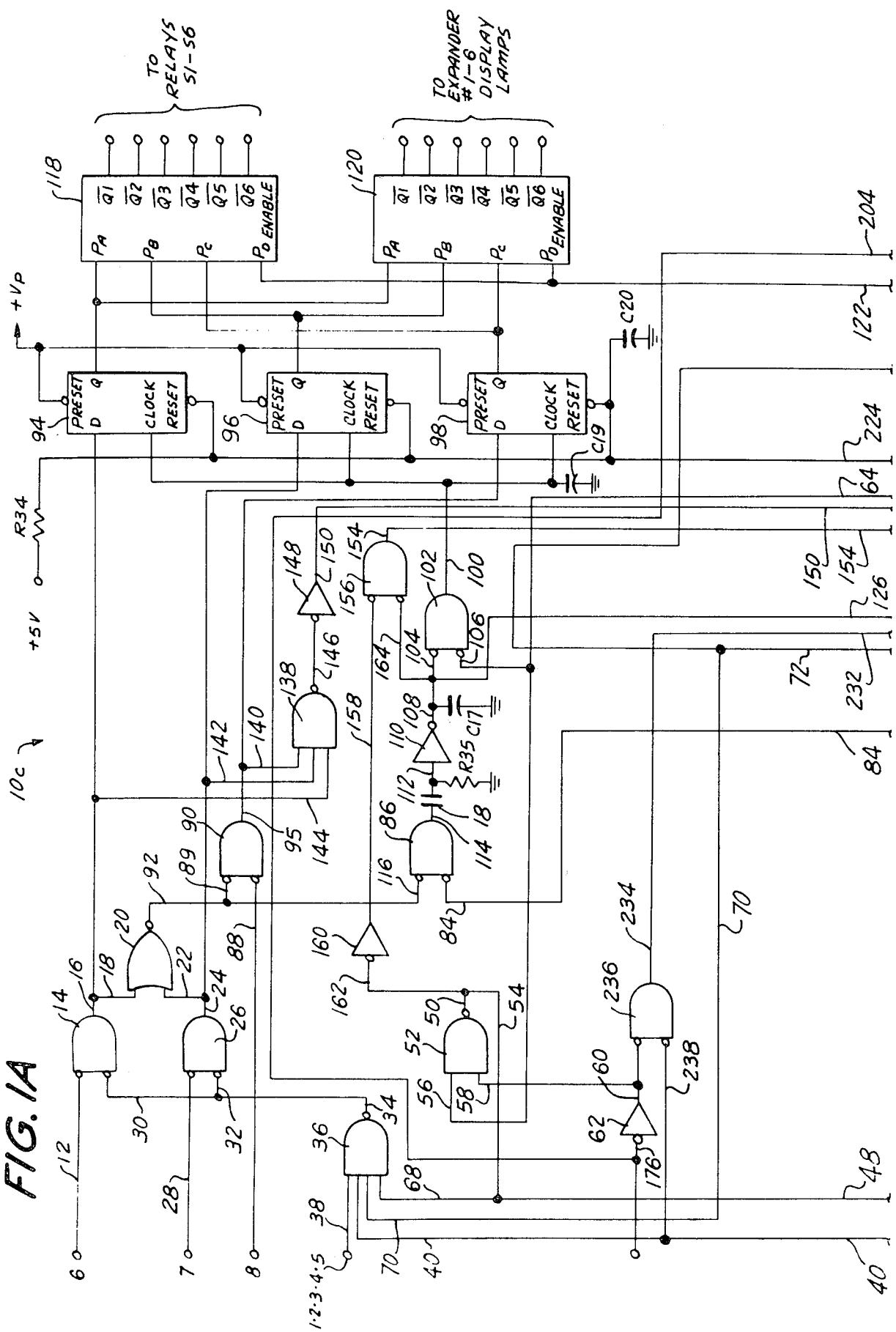
FIG. IA

APPARATUS FOR EXPANDING CHANNEL OUTPUT CAPACITY

BACKGROUND OF THE INVENTION

The present invention relates to apparatus for expanding the channel output capacity of a control device such as a programmer used in automated audio-visual performances. In particular, the present invention relates to apparatus for expanding the channel output capacity of a programmer by selectively energizing a plurality of channel expander devices.

A programmer is a device which controls the states of a plurality of output devices such as slide projectors, tape recorders, and so forth. Automatic audio-visual performances using output devices such as slide projectors and tape recorders are made possible by the programmer. The programmer automatically controls the output devices in accordance with a preselected program. The preselected program is stored in a storage medium such as a paper tape.

More specifically, the program is stored in the form of punched holes in the tape. The programmer includes a tape reader which electro-optically scans the tape and detects the presence of punched holes therein. For purposes of storing the program in the tape, the tape is divided into a fixed number of channels which run along the length of the tape and a fixed number of lines or "cues" running along the width of the tape. The tape reader scans a fixed number of tape cues per second. Depending upon the information to be stored in the program, different holes are punched in different combinations of tape cue channels. A typical programmer is described in detail in pending U.S. Application Ser. No. 486,805 filed July 9, 1974, entitled Programmer Expander for a Plurality of Devices and pending application Ser. No. 537,750, filed Dec. 31, 1974, entitled Method and Apparatus for Interrupting a Device for a Preselected Interval of Time, both of which are incorporated herein by reference. In general, the channel output capacity of the programmer severely limits the flexibility and effect of an audio-visual performance. In particular, the greatest number of output devices that a programmer can directly control is equal to the number of channels on the tape. In order to expand the channel output capacity of the programmer, the programmer may be connected to a channel expander device which controls the output devices in response to the information stored in the programmer tape. Such a channel expander device is disclosed in U.S. Application Ser. No. 486,805. Using such a channel expander device, the output of an eight channel programmer can be expanded to 40 channels.

Although the channel expander device greatly increases the flexibility and effect of an audio-visual performance by significantly increasing the channel output capacity of the programmer, only one channel expander device can be connected to the programmer. Consequently, the channel output capacity of the programmer in combination with the channel expander device, although permitting the control of a large number of output devices, may be of limited application in large scale performances which employ hundreds of output devices.

Obviously, by way of partial solution to the problem of limited channel output capacity, a channel expander device may be designed to provide sufficient output channel capacity to control the expected number of output devices employed in audio-visual performance. This approach, however, is somewhat self-limiting since, should the channel output capacity of the combined programmer and channel expander device be exceeded in the future, the system cannot be augmented by other channel expander devices to further increase the channel output capacity of the programmer. Instead, a channel expander device having still greater channel output capacity must be designed. Needless to say, the foregoing approach to solving the problem of limited programmer channel output capacity entails increasing complexity and cost.

The primary advantage of the present invention is that the channel output capacity of the programmer can be expanded without redesigning the channel expander devices.

Another advantage of the present invention is that it permits the interconnection of a plurality of existing channel expander devices in a simple and direct manner.

A still further advantage of the present invention is that it permits automatic control of a multitude of output devices without operator intervention.

Further advantages of the present invention will appear in the ensuing disclosure.

BRIEF SUMMARY OF THE INVENTION

Information in the output channels of a programmer is detected, and a set of output signals is generated in response thereto. The set of output signals is stored in a first storage means. The channel expanders are energized one at a time in response to the stored set of output signals. A reset signal is generated in response to pedetermined information in the programmer output channels. The first storage means is reset in response to the reset signal.

In an alternative embodiment of the invention, a plurality of circuits are interconnected to further increase the channel output capacity of the programmer. Each circuit includes means for detecting information in the output channels of the programmer and for generating a set of output signals in response to the programmer output channel information. First storage means store the set of output signals. The channel expanders are energized one at a time in response to the set of storage signals. A reset signal is generated in response to the predetermined information in the programmer output channel. The means for detecting information in the output channels of the programmer are disabled in response to the reset signal. Each circuit is provided with means for enabling the means for detecting programmer output channel information in the next adjacent circuit in response to the reset signal. The last circuit is provided with means for generating a predetermined digital signal which resets the next adjacent circuit and which causes the latter circuit to generate a predetermined digital signal which resets the still next adjacent circuit, and so forth, until all circuits are reset.

For the purpose of illustrating the invention, there are shown in the drawings forms which are presently preferred; it being understood, however, that this invention is not limited to the precise arrangements and instrumentalities shown.

BRIEF DESCRIPTION OF THE DRAWINGS

FIGS. 1A and 1B together show the basic timing circuitry of the present invention.

DETAILED DESCRIPTION OF THE INVENTION

Figure 3:
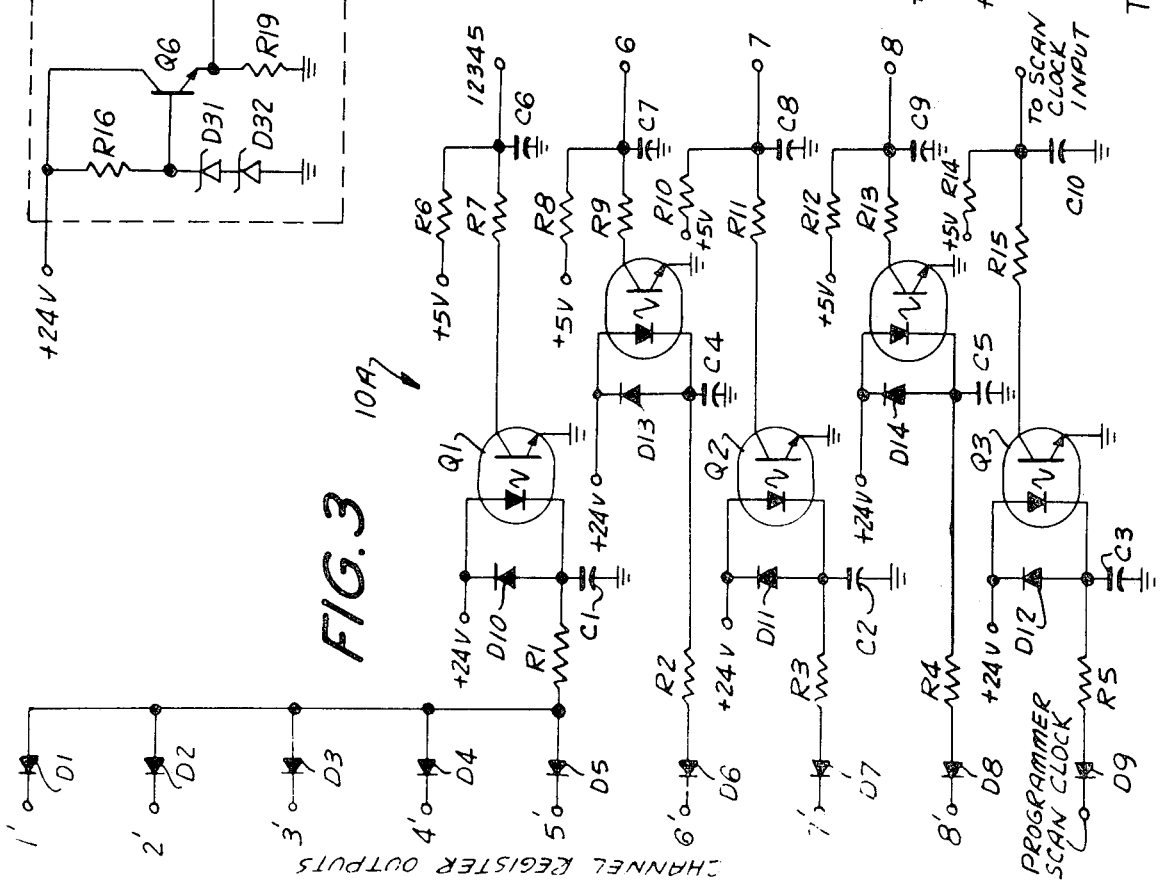
FIG. 3 shows a set of voltage isolation devices for providing the proper voltage levels for operation of the circuits shown in FIGS. 1A and 1B.

Referring to the drawings in detail, wherein like numerals indicate like elements, the channel register outputs of a programmer (not shown) are designated by the numerals $1'-5'$, $6'$, $7'$ and $8'$ in FIG. 3. The programmer controls the states of a limited number of devices according to a program stored in a storage medium such as a tape. By way of example, a programmer may control eight devices based on the information contained in an eight channel tape. A typical programmer is described in greater detail in pending U.S. Application Ser. No. 486,805 entitled Programmer Expander for a Plurality of Devices and Application Ser. No. 537,750 entitled Method and Apparatus for Interrupting a Device for a Preselected Interval of Time, both of which are incorporated herein by reference. It should be understood, however, that the programmer, per se, does not form part of the present invention. The channel register outputs are generated in the programmer and they indicate the information contained in the tape. In particular, for an eight channel tape, each of the channel register outputs indicates the information stored in one of the eight channels on a single line, hereinafter referred to as a "cue," of the tape.

The operation of a programmer is keyed to a tape reader (not shown). The tape reader scans the tape cue by cue. The information stored in each cue on the tape is detected by the tape reader and transferred to the channel registers in the programmer. Each of the channel register outputs indicates the information stored in a particular channel on a tape. For ease of reference in the ensuing portions of the disclosure, channel register output $8'$ corresponds to the eighth channel of the tape, channel register output $7'$ corresponds to the seventh channel of the tape, and so forth.

For the typical programmer described in U.S. Application Ser. No. 486,805, the channel register outputs $1'-8'$ vary between voltage levels of + 24 volts and 0 volts. Information in a channel of a tape cue is indicated by a punched hole at the location of the channel in a cue. When information in the form of a punched hole is contained in a particular channel of the tape cue, the channel register output associated with that channel is at the 0 volt level. At all other times, the channel register output is at the + 24 volts level.

Referring to circuit 10A shown in FIG. 3, channel register outputs $1'-5'$ are connected through a diode and a resistive network to a voltage isolation device $Q_1$ comprising a light emitting diode and a phototransistor. The voltage isolation device $Q_1$ may be a TIL 111 integrated circuit or any other suitable device for performing the function described hereinafter. Voltage isolation device $Q_1$ provides noise immunity and scales down the 0 volt to + 24 volt fluctuations at the channel register outputs to 0 volt to + 5 volt fluctuations.

Figure 1B:
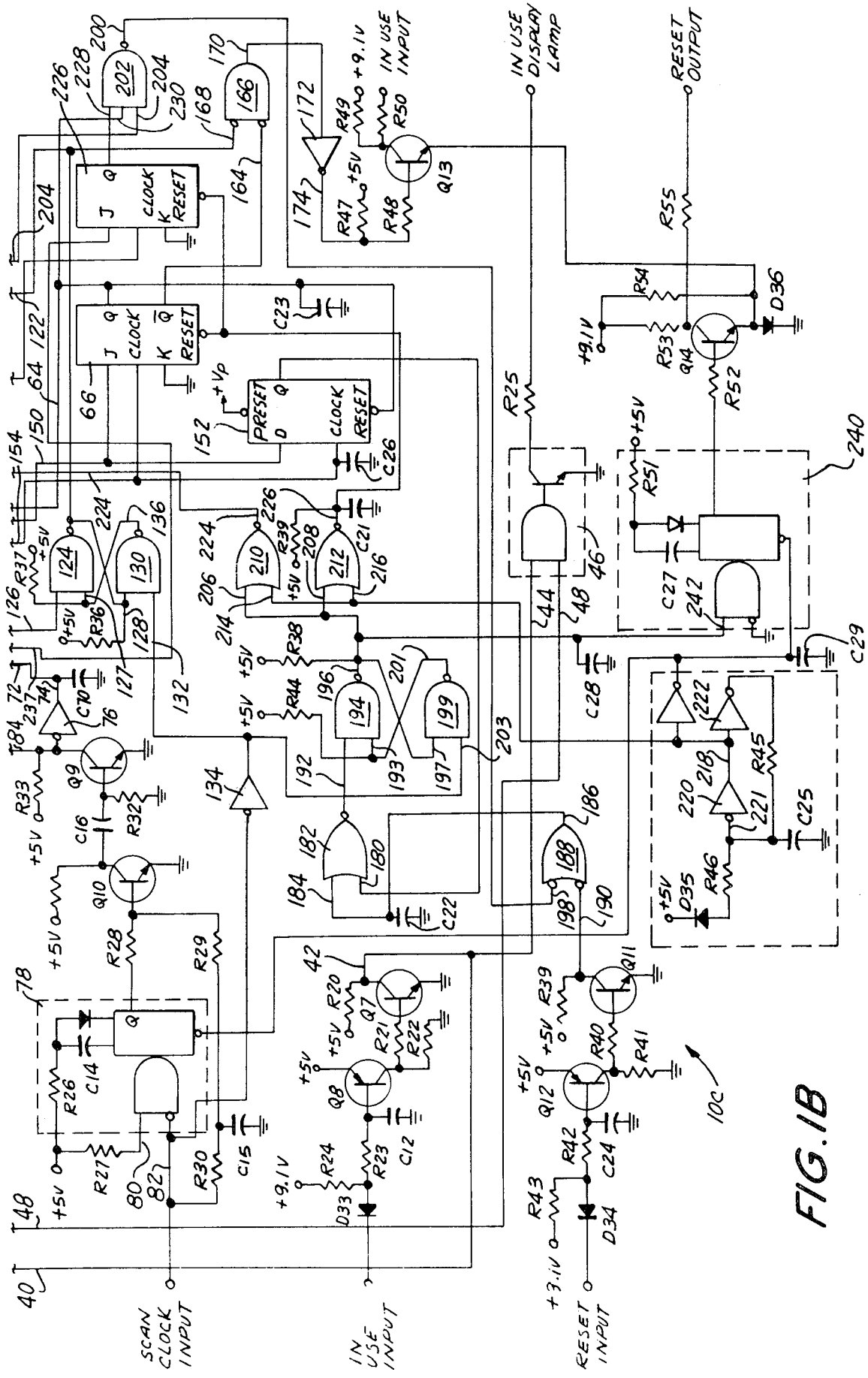

If each of the channel register outputs $1'-5'$ are at the + 24 volt level, the diodes D1-D5 will be reverse biased and the voltage isolation device $Q_1$ will be "off." Accordingly, the junction of resistors R6 and R7 will be at the + 5 volt level. On the other hand, if any of the channel register outputs are at the 0 volt level, at least one of the diodes D1-D5 will be forward biased. Current, therefore, will flow from the + 24 volt terminal through voltage isolation device $Q_1$ and the forward biased diode. Voltage isolation device $Q_1$, then, will go "on," and the voltage at the junction of resistors R6 and R7 will fall to 0 volts. Thus, if information is contained in any of the channels 1-5, voltage isolation device $Q_1$ will go "on" and the junction at resistors R6 and R7 will be 0 volts. But if no information is contained in any of the channels 1-5 transistor $Q_1$ will be "off" and the junction at resistors R6 and R7 will be at the + 5 volt level. For purposes of explanation of the operation of the circuit shown in FIGS. 1A and B, the + 5 volt level will be referred to as a "high" digital level and the 0 volt level will be referred to as a "low" digital level. The "high" digital level corresponds to a binary 1, in digital logic nomenclature, and the "low" digital level corresponds to a binary 0. Strictly speaking, the "low" digital level includes a finite range of voltages and need not be precisely 0 volts. In addition, the "high" digital level includes a finite range of voltages and need not be precisely + 5 volts. However, for purposes of explanation, the + 5 volt level may be thought of as the "high" digital level and the 0 volt level may be thought of as the "low" digital level.

From the foregoing, it should be apparent that the interconnection of diodes D1-D5 and the voltage isolation device $Q_1$ provides the logical AND operation on the channel register outputs $1'-5'$. In particular, the junction of resistors R6 and R7 provides "high" and "low" digital levels in accordance with the logic formula $1'2'3'4'5'$.

The voltage isolation devices $Q_2-Q_5$ perform functions identical to the $Q_1$ device. For instannce, voltage isolation device $Q_2$ provides a "high" digital level of + 5 volts at the junction of resistors R10 and R11 when the channel register output $7'$ is at + 24 volts, and provides a "low" digital level of 0 volts when the channel register output $7'$ is at 0 volts. That is, the voltage isolation device $Q_2$ shifts the voltage fluctuations of channel register output $7'$ from 0-+ 24 volts to 0-+ 5 volts. It should be appreciated, then, that the voltage isolation devices $Q_2- Q_5$ perform no logical functions with respect to the channel register outputs $6'-8'$ and the Clock signal, to be described hereinafter.

The output signals 12345, 6, 7 and 8 are logically equivalent to the channel register outputs $1'2'3'4'5'$ and $6'$, $7'$ and $8'$, respectively but are based on the 0-+ 5 volt levels rather than the 0-+ 24 volt levels at the channel register outputs. Output signals 12345, 6, 7 and 8 are applied to circuit 10C shown in FIGS. 1A and B. Circuit 10C is a digital circuit designed for operation between the 0 volt and + 5 volt levels provided by voltage isolation devices $Q_1$-$Q_5$ in circuit 10A. It should be appreciated, however, that circuits 10A and 10C may be modified to operate at voltage levels other than 0 volts and + 5 volts without affecting the functions of the circuits. More particularly, although circuits 10A and 10C are described hereinafter with respect to digital components which function with respect to a "high" digital level of + 5 volts and a "low" digital level of 0 volts, the same digital function may be performed by other commercially available digital components which function at voltage levels other than 0 volts and + 5 volts. The voltage levels themselves are not, per se, part of the present invention.

As already mentioned, each cue on a tape contains information in the form of punched holes. The information may be used by the programmer for determining the operational states of a plurality of devices. In addition, the information may be used for increasing the channel capacity of the programmer. In pending U.S. Application Ser. No. 486,805 entitled Programmer Expander for a Plurality of Devices, apparatus is described for expanding the channel capacity of a programmer. Hereinafter, that apparatus will be referred to as an "expander." In particular, the expander described in U.S. Application Ser. No. 486,805 may be used to increase the channel capacity of a programmer using an eight channel tape from eight channels to forty channels. To increase the channel capacity of the programmer further, the expanders described in U.S. Application Ser. No. 486,805 may be connected together. For example, in FIG. 4, $n$ expanders are shown connected to an eight channel programmer through a circuit designated generally as 10. Circuit 10 includes circuits 10A, 10B and 10C shown in FIGS. 1A, 1B, 2 and 3. The operation of circuit 10A has already been described. The operation of circuits 10B and 10C will be described hereinafter. Circuit 10 automatically steers program commands from the programmer to each of the expanders 1 through $n$. Accordingly, the resultant channel capacity of expanders 1 through n is 40 × n channels. Thus, whereas the programmer has only eight channels and, therefore, can only control the states of eight devices, circuit 10 permits the programmer to control 40 × $n$ devices. In other words, the present invention increases the channel output capacity of the eight channel programmer by a factor of 40n÷ 8 or 5n.

Figure 5:
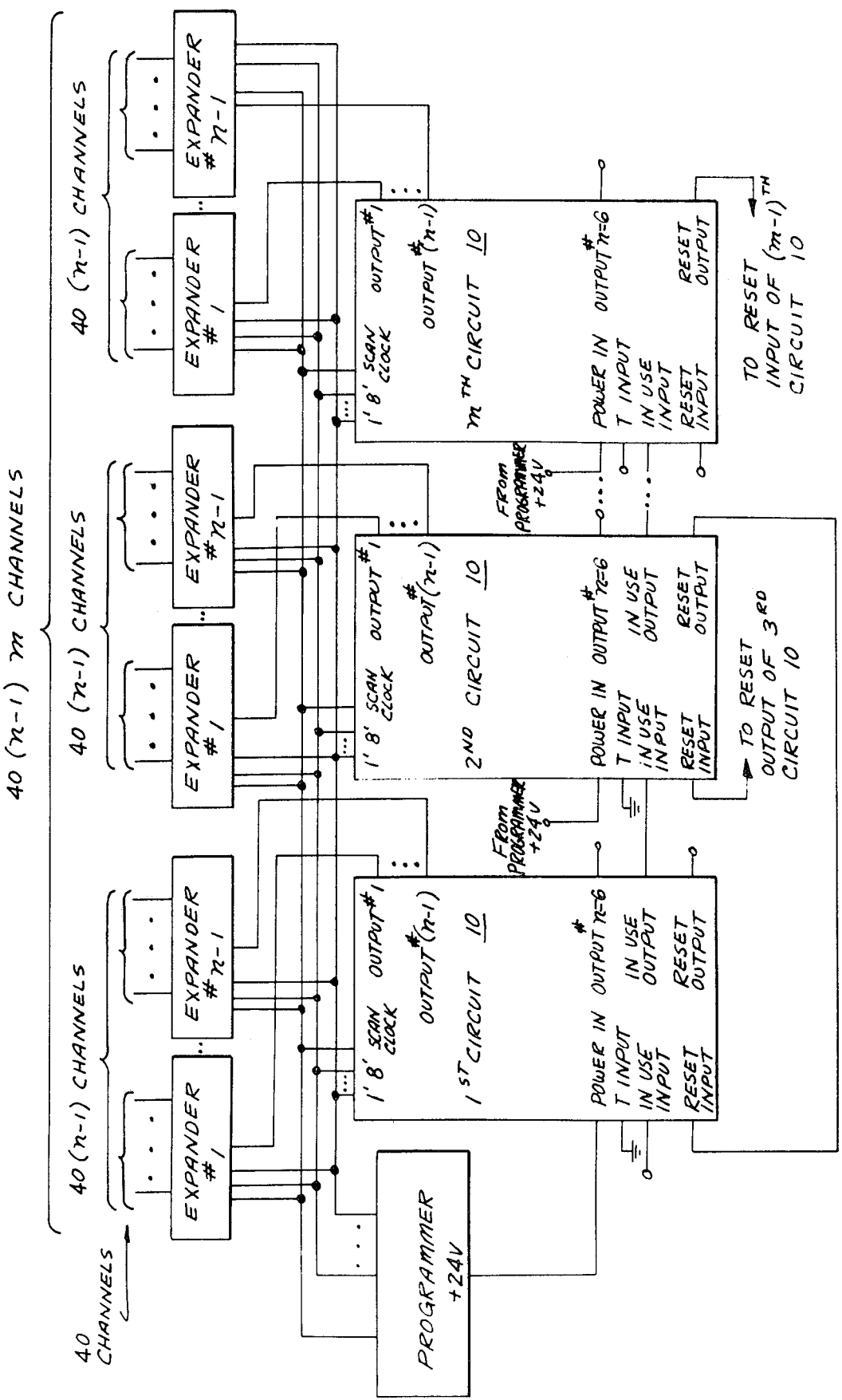
FIG. 5 shows the interconnection of a plurality of circuits constructed in accordance with FIGS. 1A, 1B, 2 and 3 for further increasing the programmer channel output capacity.

Further, as shown in FIG. 5, two or more of the circuits 10, each constructed in accordance with the principles of the present invention, may be connected in cascade to further increase the channel output capacity of the programmer. For example, where $m$ circuits 10 are connected in cascade, as many as 40 × × (n-1) ×m devices may be controlled by the programmer. Thus, the channel output capacity of the programmer may be increased by a factor of 40(n-1)m÷8 or 5(n-1)m. When the circuits are connected in cascade, the output #$n$ of each circuit 10 is not connected to any external circuitry, that is, the output #$n$ is floating. Each circuit 10, therefore, uses only outputs #1-#(n-1) to expand the channel capacity of the programmer. The operation of the present invention in this mode is described more fully hereinafter.

Figure 2:
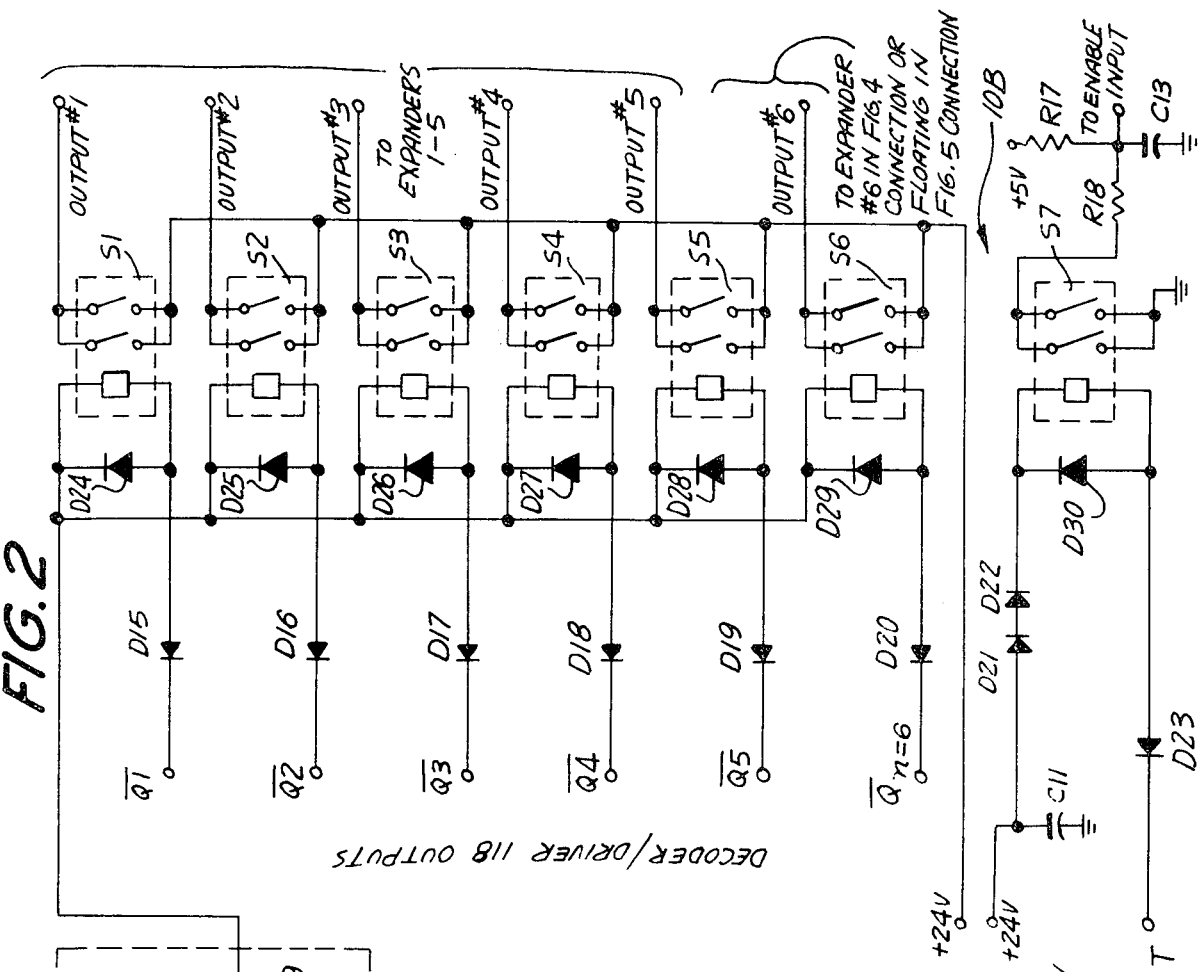
FIG. 2 shows a set of relay circuits which control the channel expander devices in conjunction with the circuits shown in FIGS. 1A and 1B.
Figure 4:
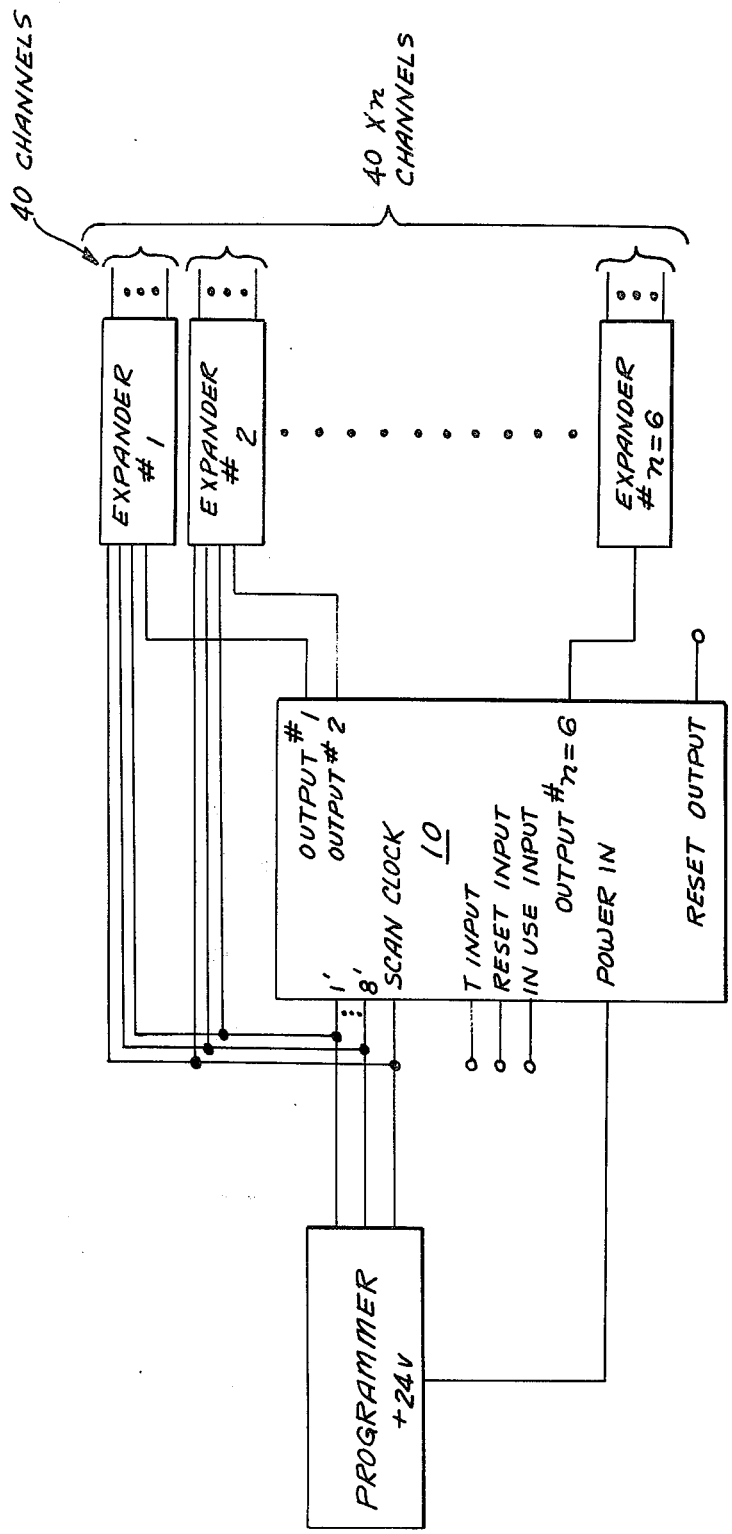
FIG. 4 shows the circuits in FIGS. 1A, 1B, 2 and 3 connected to the programmer and a plurality of channel expander devices.

Referring to FIG. 2, there is shown a circuit 10B for energizing the expanders shown in FIGS. 4 and 5, one at a time. More specifically, each of the expanders shown in FIGS. 4 and 5 requires a source of + 24 volts in order to operate. Circuit 10B distributes this voltage to each of the expanders based on the outputs $\overline{Q}_1$-$\overline{Q}_n$ of decoder/driver 118, see FIG. 1A. The decoder/driver outputs vary between 0 volts and + 24 volts, as described more fully below. Thus, the outputs of decoder/driver 118 determine the operating states of diodes D15-D20. For purposes of explanation, it will be assumed that six expanders are to be connected to circuit 10 as shown in FIG. 4, that is, it will be assumed that $n$=6. It should be understood, however, that circuit 10 may be modified to accommodate more than six expanders, that is, $n$ may be greater than six, within the spirit and scope of the invention.

If the decoder/driver outputs $\overline{Q}_1$-$\overline{Q}_5$ are all at + 24 volts, each of the diodes D15-D20 in FIG. 2 will be reverse biased, each of the relays S1-S6 will be open, and outputs #1- #6 will be floating. Accordingly, none of the expanders #1- #6 will be energized. As will be explained more fully hereinafter, no more than one of the decoder/driver outputs will be at the 0 volt level at any given time. Assuming that one of the decoder/driver outputs is at the 0 volts level, the associated relay will close, thereby supplying a voltage of + 24 volts to one of the expanders.

Relays S1-S6 are conventional relays which close when current flows through a coil inside the relay. The relays are conventional devices, and their structure and operation need not be described further in disclosing the present invention. The relays are connected through a transistor $Q_6$ in circuit 10B to the + 24 volt supply. Transistor $Q_6$ provides a + 18 volt output at its emitter terminal and prevents excessive current from flowing through the relays. Transistor $Q_6$ is necessary when relays S1-S6 are of the low resistance coil reed type to prevent the coil from overheating and burning out. However, if relays other than the low resistance coil reed type are used, transistor $Q_6$ may be eliminated and the + 24 volt supply may be directly connected to the relays.

If decoder/driver output $\overline{Q}_1$ is at 0 volts while decoder/driver outputs $\overline{Q}_2$-$\overline{Q}_6$ are at + 24 volts, diode D15 will be forward biased while diodes D16-D20 will be reverse biased. As a result, current will flow through relay S1, causing that relay to close, while relays S2-S6 remain open. When relay S1 closes, + 24 volts is transmitted through the relay S1 contacts to output #1. At the same time, however, outputs #2- #6 are floating, that is, outputs #2- #6 are not energized. Similarly, if decoder/driver output $\overline{Q}_2$ is at 0 volts while decoder/driver outputs $\overline{Q}_1$ and $\overline{Q}_3$-$\overline{Q}_6$ are at + 24 volts, only output #2 will be energized. In Table 1, below, the states of the expanders #1- #6 are supplied for each combination of the outputs of decoder/driver 118.

TABLE 1

| $\overline{Q}_1$ | $\overline{Q}_2$ | $\overline{Q}_3$ | $\overline{Q}_4$ | $\overline{Q}_5$ | $\overline{Q}_6$ | Expander Energized |
|---|---|---|---|---|---|---|
| 0v | 24v | 24v | 24v | 24v | 24v | #1 |
| 24v | 0v | 24v | 24v | 24v | 24v | #2 |
| 24v | 24v | 0v | 24v | 24v | 24v | #3 |
| 24v | 24v | 24v | 0v | 24v | 24v | #4 |
| 24v | 24v | 24v | 24v | 0v | 24v | #5 |
| 24v | 24v | 24v | 24v | 24v | 0v | #6 |

As will be shown in greater detail hereinafter, the decoder/driver outputs $\overline{Q}_1$-$\overline{Q}_6$ are uniquely determined by the signals 6, 7, 8, and 12345, generated by voltage isolation devices $Q_1$-$Q_5$.

The operation of circuit 10 depends upon the particular connection of its inputs and outputs. As shown in FIGS. 4 and 5, circuit 10 can be connected either directly to n expanders or to (n-1) expanders and another circuit 10. That is, circuit 10 may be connected to a programmer either singly in cascade. For purposes of the following description, it will be assumed that circuit 10 is connected as shown in FIG. 4 where n = 6 and the programmer is an eight channel programmer.

Refering to FIG. 1A, the signal 6 is connected to the input 12 of a NOR gate 14. The output 16 of NOR gate 14 is connected to the input 18 of a NOR gate 20. Another input of NOR gate 20, input 22, is connected to the output 24 of a NOR gate 26. The signal 7 is connected to the input 28 to NOR gate 26. The second inputs to NOR gates 14 and 26, inputs 30 and 32, respectively are connected together to the output 34 of a NAND gate 36.

The signal 8 is connected to the input 88 of a NOR gate 90. The second input, input 89, of NOR gate 90 is connected to the output 92 of NOR gate 20. The signal 12345 is connected to an input 38 to NAND gate 36.

In the preferred embodiment described herein, the channel register outputs in the programmer fluctuate between 0 volts and + 24 volts. If a channel on a tape contains information, in the form of a punched hole, the channel register output corresponding to that channel will be 0 volts. Otherwise, the channel register output will be + 24 volts. As already explained, the 0 volt to + 24 volt variation of the channel register outputs is scaled down to a 0 volt to + 5 volt variation by voltage isolation devices $Q_1$-$Q_5$. Thus, the signals 6, 7, 8 and 12345 fluctuate between 0 and + 5 volts depending on the presence or absence of information in the tape channel.

If all of the inputs to NAND gate 36 are "high," that is, at + 5 volts, the NAND gate output 34 will go "low," that is, the NAND gate output 34 will go to 0 volts. When NAND gate output 34 goes "low" it enables NOR gates 14 and 26. Input 40 to NAND gate 36 is connected to the output 42 of a transistor $Q_7$. The base of transistor $Q_7$ is connected, through a resistor R21, to the collector of a transistor $Q_8$. The base of transistor $Q_8$ is connected, through a resistor R23 and a diode D33, to an In Use input. The In Use input is floating when only one circuit 10 is connected to the programmer and expanders as shown in FIG. 4. By floating, it is meant that the In Use input is not connected to an external circuitry. The base of transistor $Q_8$ is also connected to a + 9.1 volt supply through resistors R23 and R24. When the In Use input is floating, the + 9.1 volt supply biases transistor $Q_8$ "off," and the collector of transistor $Q_8$ will be at 0 volts. Since, at this time, the collector of transistor $Q_8$ is at 0 volts, it biases transistor $Q_7$ "off." The collector of transistor $Q_7$ is connected through resistor R20 to a + 5 volt supply. Accordingly, when transistor $Q_7$ is "off," its collector will be at + 5 volts and output 42 will be at a "high" digital level.

The output 42 of transistor $Q_7$ is also connected to the input 44 of a peripheral driver 46. Peripheral driver 46 is a conventional device, well-known in the art, for driving a load such as a display lamp. Peripheral driver 46 is connected through a resistor R25 to an In Use display lamp, see FIG. 1B. When the In Use display lamp is energized, it indicates that the circuit 10 is in use. When inputs 44 and 48 to peripheral driver 46 are both "high," peripheral driver 46 drives the In Use Display lamp "on." The input 48 to peripheral driver 46 is connected to the output 50 of a NAND gate 52 by means of line 54. The NAND gate output 50 is "high" whenever either of the inputs 56 and 58 to NAND gate 52 are "low."

The input 58 to NAND gate 52 is connected to the output 60 of an inverter 62. The input 176 of inverter 62 is connected to the Enable Input. The Enable Input is connected to the junction of resistors R17 and R18, see FIG. 2. Referring to FIG. 2, resistor R18 is connected to relay S7. Relay S7 is connected, through diodes D21 and D22, to the + 24 volt supply. In addition, relay S7 is connected, through diode D23, to input terminal T. When circuit 10 is connected directly to the programmer and the expanders, as shown in FIG. 4, terminal T is floating. Accordingly, no current flows through relay S7 and relay S7 stays open. As a result, the junction of resistors R17 and R18 will be at + 5 volts, that is, will be "high." The Enable Input of circuit 10, then, will also be "high." Since the Enable Input is connected to the input 176 of inverter 62, the output of inverter 62 will be "low," causing the NAND gate output 50 to go "high." As a result, the input 48 to peripheral driver 46 will be "high," and peripheral driver 46 will drive the In Use display lamp "on" to indicate that circuit 10 is in use. NAND gate output 50 is also connected to an input 68 to NAND gate 36. Accordingly, input 68 will be "high" at this time.

The input 70 to NAND gate 36 is connected, through line 72, to the output 74 of an inverter 76. The input of inverter 76 is connected, through transistors $Q_9$ and $Q_{10}$, to the Q output of a retriggerable one-shot 78. One-shot 78 may comprise a Texas Instruments 74123 retriggerable resettable one-shot having external timing components R26 and C14 connected thereto, according to principles well-known in the art, for achieving a predetermined pulse duration at the Q output of the one-shot. It should be understood that the external timing components R26 and C14 form part of the one-shot 78.

One-shot 78 is provided with two inputs 80 and 82. Input 80 is tied to the + 5 volt supply through a resistor R27 and, therefore, it is permanently clamped to a "high" level. Input 82 is connected to a Scan Clock input. The Scan Clock input is a series of digital pulses having a pulse repetition frequency corresponding to the rate at which the cues of the tape are scanned by the tape reader.

The Scan Clock input is generated by the programmer. Typically, the tape reader can automatically scan the tape at either 20 cues per second or 60 cues per second. At a scan rate of 20 cues per second, the Scan Clock input will be at 0 volts for 30 millisec and at + 24 volts for 20 millisec, and there will be twenty such pulses every second. For a scan rate of 60 cues per second, the Scan Clock input will be at 0 volts for 10 millisec and + 24 volts for 6.666 millisec, and there sill be sixty such pulses every second. During the 0 volt intervals, the channel register outputs will appear at terminals 1'-8', see FIG. 3. The 0 volt to + 24 volt fluctuations of the Scan Clock are scaled down to 0 to + 5 volts fluctuations, without affecting the timing, by voltage isolation device $Q_3$.

When a + 5 volt to 0 volt transition occurs at the Scan Clock input, it triggers the one-shot input 82, causing one-shot 78 to generate a "high" pulse at its Q output. The Q output of one-shot 78 is connected, through resistor R28, to a loop comprising resistors R29 and R30 and capacitor C15. The purpose of this loop is to prevent the transitor $Q_{10}$ from changing states if the one-shot 78 is triggered by high frequency moise. In the preferred embodiment of the present invention, the elements R26 and C14 are chosen to produce a pulse at the Q output of one-shot 78 which is approximately 5 millisec long. The loop comprising resistors R29 and R30 and capacitor C15 will prevent transistor $Q_{10}$ from turning "on" in response to the Q output of one-shot 78 unless the input signal at terminal 82 is "low" for 30 millisec, for a scan rate of 20 cues per second, or for 10 millisec, for a scan rate of 60 cues per second.

Assuming a scan rate of 20 cues per second, the + 5 volt to 0 volt transition of the Scan Clock input pulse, that is, the leading edge of the Scan Clock input pulse, will trigger one-shot 78. In response, one-shot 78 will produce a 5 millisec "high" pulse at its Q output. Prior to the leading edge of the Scan Clock input pulse, the input 82 of one-shot 78 is "high." Accordingly, prior to the leading edge of the Scan Clock input pulse, current will flow through resistors R29 and R30 to the base of transistor $Q_{10}$, turning transistor $Q_{10}$ "on." When the Scan Clock input pulse drops to 0 volts, the Q output of one-shot 78 goes "high," keeping transistor $Q_{10}$ "on." When, however, one-shot 78 times out, its Q output goes "low." If the triggering signal at input 82 of one-shot 78 is a valid Scan Clock input pulse, when one-shot 78 times out the input 82 of one-shot 78 will be "low" since the Scan Clock input pulse stays "low" for more than 5 millisec. As a result, when one-shot 78 times out, transistor $Q_{10}$ is driven "off." Should, however, the triggering signal at input 82 of one-shot 78 be "low" for less than 5 millisec, that is, should the triggering signal at input 82 of one-shot 78 be "noise," when one-shot 78 times out the input signal at input 82 will have already returned to the "high" level. Accordingly, although the Q output of one-shot 78 goes "low" after 5 millisec, the input 82 will be "high," keeping transistor $Q_{10}$ "on." Thus, one-shot 78 will not turn transistor $Q_{10}$ "off" unless the triggering signal at input 82 is a valid Scan Clock pulse.

As mentioned previously, transistor $Q_{10}$ is initially "on." As a result, the collector of $Q_{10}$ is initially at 0 volts. When, however, one-shot 78 times out to turn transistor $Q_{10}$ "off," the collector of transistor $Q_{10}$, which is connected to the + 5 volts applied to resistor R31, rises to the + 5 volt level. The 0 volt to + 5 volt transition at the collector of transistor $Q_{10}$ is differentiated by capacitor C16 and resistor R32 to produce a 1 millisec "high" pulse at the base of transistor $Q_9$. Prior to the 1 millisec "high" pulse, the base of transistor $Q_9$ is "low," that is, transistor $Q_9$ is "off." In response to the 1 millisec "high" pulse appearing at its base, transistor $Q_9$ goes "on" for 1 millisec, generating a "low" pulse 1 millisec long at its collector. The collector of transistor $Q_9$ is connected to the input of inverter 76. The output 74 of inverter 76, then, goes "high" for 1 millisec when one-shot 78 times out.

The 1 millisec "high" pulse at the output 74 of inverter 76 is transmitted, by line 72, to the input 70 of NAND gate 36. As already explained, at this time, inputs 40 and 68 are "high." Assuming that none of the channel register outputs numbered 1'-5' are at 0 volts, input signal 12345 appearing at the input 38 to NAND gate 36 will be "high" at this time. Consequently, NAND gate 36 generates a 1 millisec "low" pulse at its output 34. Since NOR gate inputs 30 and 32 are connected together to NAND gate output 34, NOR gates 14 and 26 will be enabled for 1 millisec.

Assuming that only the seventh channel on the tape contains information, signals 6 and 8 at NOR gate inputs 12 and 88 will be "high" and signal 7 will be "low" for the duration of the Scan Clock input pulse, that is, for 30 millisec. Accordingly, if only tape channel 7 contains information, NOR gates 14 and 90 will be disabled. By disabled, is meant that the NOR gate outputs will remain "low" despite the signals appearing at the other NOR gate inputs. Consequently, both inputs 28 and 32 of NOR gate 26 will be "low" for a 1 millisec interval. NOR gate 26, therefore, will generate a 1 millisec "high" pulse at output 24. Since NOR gates 14 and 90 are disabled at this time, NOR gate outputs 94 and 16 will be "low" during the 1 millisec interval.

NOR gate output 16 is connected to the D input of flip-flop 94; NOR gate output 24 is connected to the D input of flip-flop 96; and NOR gate output 95 is connected to the D input of flip-flop 98. Flip-flops 94, 96 and 98 may be Texas Instruments 7474 D-type edge triggered flip-flops having separate reset and preset inputs. The preset inputs of each of the flip-flops are connected together and permanently tied to a positive potential + $V_p$. Consequently, the preset input of each of the flip-flops is permanently disabled. The reset inputs of the flip-flops are connected together and permanently tied, through a resistor R34 to the +5 volt supply. The reset inputs of the flip-flops, however, are not permanently disabled since they are connected to the output 224 of NOR gate 210. When the 1 millisec "high" pulse appears at the NOR gate output 24, the D input of flip-flop 94 will be "low," the D input of flip-flop 96 will go "high," and the D input of flip-flop 98 woll be "low." In addition, at this time, the D outputs of flip-flops 94, 96 and 98 will all be "low."

When the D input of one of the flip-flops is "high," a positive going edge at the clock input of the flip-flop will cause the Q output to go from a "low" to a "high." The clock inputs of each of the flip-flops 94, 96 and 98 are connected to the output 100 of a NOR gate 102. The NOR gate 102 has two inputs, inputs 104 and 106. Input 106 is connected to the Q output of a flip-flop 66 by a line 64. Input 104 is connected to the output 108 of an inverter 110. The input 112 of inverter 110 is connected to the output of a differentiating circuit comprised of capacitor C18 and Resistor R35. The input of the differentiating circuit C18, R35 is connected to the output 114 of NOR gate 86. The input 116 to NOR gate 86 is connected to the output 92 of NOR gate 20. The input 84 to NOR gate 86 is connected to the collector of transistor $Q_9$.

As mentioned previously, when the one-shot 78 times out after being triggered by the Scan Clock input pulse, transistor $Q_9$ produces a 1 millisec "low" pulse at its collector. As a result, a 1 millisec "high" pulse appears at the input 70 to NAND gate 36 and, in response, NOR gate 26 generates a 1 millisec "high" pulse at its output 24, assuming that only the seventh channel on the tape contains information. Since signal 6 at input 12 to NOR gate 14 is "high" during this time, NOR gate output 16 will be "low," enabling NOR gate 20. By enabled, is meant that the NOR gate output is free to respond to changes in the signal appearing at the other NOR gate input. The 1 millisec "high" pulse appearing at NOR gate output 24 is transmitted to the input 22 of NOR gate 20. Accordingly, NOR gate 30 produces a 1 millisec "low" pulse at its output 92. The 1 millisec "low" pulse at NOR gate output 92 is transmitted to the input 116 to NOR gate 86. Consequently, both inputs 116 and 84 to NOR gate 86 carry 1 millisec "low" pulses when the one-shot 78 times out.

In response to the 1 millisec "low" pulses at its inputs 116 and 84, NOR gate 86 produces a 1 millisec "high" pulse at its output 114. The differentiator circuit C18, R35 differentiates the 1 millisec "high" pulse and produces a narrower "high" pulse of approximately 100 microsecs duration at the input 112 to inverter 110. Inverter 110 inverts the 100 microsec "high" pulse and generates a 100 microsec "low" pulse at its output 108. This 100 microsec "low" pulse is transmitted to the input 104 or NOR gate 102. Input 106 of NOR gate 102 is connected by line 64 to the Q output of flip-flop 66. At this time, the Q output of flip-flop 66 is "low," so NOR gate 102 is enabled. NOR gate 102, then, produces a 100 microsec "high" pulse at its output 100 in response to the output 108 of inverter 110. The "high" 100 microsec pulse appearing at the output 100 of NOR gate 102 clocks the flip-flops 94, 96 and 98, causing the Q output of each flip-flop to assume the digital state of its D input. Thus, when only the seventh channel on the tape contains information, the "high" pulse at NOR gate output 100 causes the Q output of flip-flop 94 to remain "low," the Q output of flip-flop 96 to go "high," and the Q output of flip-flop 98 to remain "low."

The Q outputs of flip-flops 94, 96 and 98 are each connected to decoder/drivers 118 and 120. Decoder/drivers 118 and 120 may be Texas Instruments 7445 BCD-to-decimal decoder/drivers. Such a decoder/driver accepts BCD inputs and provides appropriate outputs to drive a plurality of devices. In a preferred embodiment, decoder/driver 118 drives the six relays S1-S6 which energize expanders #1- #6. Decoder/driver 120 drives six display lamps, each lamp being associated with one of the expanders. The Q outputs of the flip-flops 94, 96 and 98 are connected to the $P_a$, $P_b$, and $P_c$ inputs of the decoder/drivers 118 and 120 as shown in FIG. 1A. The $P_d$ inputs of each of the decoder/drivers are connected together to the output 122 of a NAND gate 124.

NAND gates 124 and 130 form a set/reset circuit for enabling and disabling the decoder/drivers 118 and 120. The input 126 to NAND gate 124 is connected to the input 104 of NOR gate 102. Input 127 to NAND gate 124 is connected through resistor R37 to the + 5 volt supply. Before the 100 microsec "low" pulse appears at NAND gate input 104, NAND gate input 127 is "high" and NAND gate output 122 is "low". The 100 microsec "low" pulse appearing at the NOR gate input 104 appears at the input 126 to NAND gate 124, causing NAND gate output 122 to go "high." The NAND gate output 122 is connected to the input 128 of a NAND gate 130. Another input of the NAND gate 130, input 132, is connected through an inverter 134 to the input 82 of one-shot 78. When the Scan Clock input pulse appears at the one-shot input 82, the inverter 134 transmits an inverted form of the pulse to NAND gate input 132. Thus, assuming a scan rate of 20 cues per second, a 30 millisec "high" pulse appears at the input 132 to NAND gate 130. The input 128 to NAND gate 130 is connected to the + 5 volt supply through resistor R36 and, as previously mentioned, to the output 122 of NAND gate 124. Accordingly, when the NAND gate output 122 goes "high," the input 132 to NAND gate 130 will also be "high." The output 136 of NAND gate 130, therefore, will go "low" at this time. The NAND gate output 136 is connected to the input 127 of NAND gate 124. When NAND gate output 136 goes "low," then, it keeps NAND gate output 122 "high."

When NAND gate output 122 goes "high," it drives the $P_d$ inputs of decoder/drivers 118 and 120 "high." Assuming that only the seventh channel on the tape contains information, the Q output of flip-flop 94 will be "low," the Q output of flip-flop 96 will be "high," and the Q output of flip-flop will be "low" at this time. The Q output of flip-flop 94 is connected to the $P_a$ inputs of decoder/drivers 118 and 120, the Q output of flip-flop 96 is connected to the $P_b$ inputs of decoder/drivers 118 and 120, and the Q output of flip-flop 98 is connected to the $P_c$ inputs of decoder/drivers 118 and 120. When the $P_d$ inputs of decoder/drivers 118 and 120 are "high," none of the outputs of the decoder/drivers shown in FIG. 1A will be at 0 volts, that is, the decoder/drivers will be disabled. In particular, the outputs of each decoder/driver will all be at + 24 volts. As a result, relays S1-S6 will all be open and none of the expanders will be energized. When, however, the Scan Clock input pulse at input 82 of one-shot 78 returns to the "high" level, the input 132 to NAND gate 130 goes "low," causing the $P_d$ inputs to decoder/drivers 118 and 120 to go "low." More specifically, when the input 132 to NAND gate 130 goes "low," it causes NAND gate output 136 to go "high." This, in turn, causes the input 127 to NAND gate 124 to go "high." Since, at this time, the 100 microsec "low" pulse appearing at the output 108 of inverter 110 will have expired, that is, since the inverter output 108 will be "high," NAND gate output 122 will go "low." When NAND gate output 122 goes "low," it causes input 128 to NAND gate 130 to go "low," keeping NAND gate output 136 "high." In addition, when NAND gate output 122 goes "low," it drives the $P_D$ inputs to decoder/drivers 118 and 120 "low." Consequently, the decoder/drivers 118 and 120 will be enabled. Since the $P_a$ and $P_c$ inputs of decoder/drivers 118 and 120 are also "low" at this time, while the $P_b$ inputs of decoder/drivers 118 and 120 are "high," the $\overline{Q}_1$, $\overline{Q}_3$, $\overline{Q}_4$, $\overline{Q}_5$, and $\overline{Q}_6$ outputs of each decoder/driver will be at + 24 volts while the $\overline{Q}_2$ outputs of each decoder/driver will be at 0 volts or "low." Accordingly, only relay S2 will be energized, that is, only relay S2 will close. Expander #2, therefore, will be the only expander to be energized at this time.

In summary, then, when only the seventh channel of a tape cue contains information, expander #2 will be energized, and all other expanders will remain inactive. When expander #2 is energized, it is free to receive commands from the programmer and to control the operational states of 40 devices in response thereto, as described in U.S. application Ser. No. 486,805 entitled Programmer Expander For A plurality of Devices, incorporated herein by reference.

From the foregoing, it can readily be seen that the signals 6, 7, 8 and 12345 uniquely determine which expanders will be activated. The circuit 10 can be analyzed, as above, to compute the particular expander which is energized according to particular combinations of the signals 6, 7, 8 and 12345. The expander activated by a particular combination of the foregoing signals, and the corresponding conditions of the decoder/drivers 118 and 120, are supplied below in Table 2.

TABLE 2

| Signal Combinations | | | | Decoder/Driver Inputs | | | | Decoder/Driver Outputs | | | | | | Expanders Activated |
|---|---|---|---|---|---|---|---|---|---|---|---|---|---|---|
| 6 | 7 | 8 | 1–5 | $P_a$ | $P_b$ | $P_c$ | $P_d$ | $\bar{Q}_1$ | $\bar{Q}_2$ | $\bar{Q}_3$ | $\bar{Q}_4$ | $\bar{Q}_5$ | $\bar{Q}_6$ | |
| low | high | high | high | high | low | low | low | 0v | +24v | +24v | +24v | +24v | +24v | #1 |
| high | low | high | high | low | high | low | low | +24v | 0v | +24v | +24v | +24v | +24v | #2 |
| low | low | high | high | high | high | low | low | +24v | +24v | 0v | +24v | +24v | +24v | #3 |
| low | high | low | high | high | low | high | low | +24v | +24v | +24v | 0v | +24v | +24v | #4 |
| high | low | low | high | low | high | high | low | +24v | +24v | +24v | +24v | 0v | +24v | #5 |
| low | low | low | high | high | high | high | low | +24v | +24v | +24v | +24v | +24v | 0v | #6 |

It should be noted that, when circuit 10 is connected as shown in FIG. 4, the signal combination 6-"low," 7-"low," 8-"low," referred to hereinafter as the "678" signal combination, causes the $Q_6$ outputs of decoder/-drivers 118 and 120 to go "low" while the other decoder/driver outputs remain "high." Thus, expander #6 is energized in response to the signal combination 678.

As already mentioned, if signal combination 678 is generated, decoder/driver 118 will cause expander #6 to be activated. In addition, the 678 signal combination can be used as a reset signal. If the 678 signal combination is generated two consecutive times, the flip-flops 94, 96 and 98 and the decoder/drivers 118 and 120 will be automatically reset, thereby de-energizing all six of the expanders. More specifically, NOR gate 210 will cause flip-flops 94, 96 and 98 to be reset when the second 678 signal combination is generated.

The output 224 of NOR gate 210 is connected to the reset inputs of flip-flops 94, 96 and 98. When NOR gate output 224 is "high" the reset inputs of flip-flops 94, 96 and 98 are disabled. When, however, the NOR gate output 224 goes "low," it resets flip-flops 94, 96 and 98. Input 206 of NOR gate 210 is connected to input 208 of NOR gate 212 and output 196 of NAND gate 194. NAND gate output 196 is also connected, through resistor R38, to the + 5 volt supply. Input 214 of NOR gate 210 is connected to input 216 of NOR gate 212 and to output 218 of inverter 220. Output 226 of NOR gate 212 is connected to the + 5 volt supply, by resistor R39, and to the reset inputs of flip-flops 66 and 226.

Input 192 of NAND gate 194 is connected to the output of NOR gate 182. Input 184 of NOR gate 182 is connected to output 186 of NAND gate 188. Input 180 of NOR gate 182 is connected to the Q output of flip-flop 152. The reset input to flip-flop 152 is connected to the Q output of flip-flop 66, and the preset input of flip-flop 152 is permanently connected to the positive potential + $V_p$. Thus, the preset input of flip-flop 152 is permanently disabled.

Input 190 to NAND gate 188 is connected to the collector of a transistor $Q_{11}$. The base of transistor $Q_{11}$ is connected through resistor R40 to the collector of a transistor $Q_{12}$. The base of transistor $Q_{12}$ is connected through resistor R42 and diode D34 to the Reset Input terminal. In addition, the base of transistor $Q_{12}$ is connected through resistor R43 to the + 9.1 volt supply. When the circuit 10 is connected to the programmer and the expanders as shown in FIG. 4, the Reset input terminal is left floating. Since the base of transistor $Q_{12}$ is connected to the + 9.1 volt supply by resistor R43, when the Reset Input is floating, transistor 212 will be driven "off." When transistor $Q_{12}$ is "off," to its collector will be at 0 volts. Accordingly, transistor $Q_{11}$ will also be "off," and its collector will be at + 5 volts. As a result, input 190 to NAND gate 188 will be "high."

Initially, the Q output of flip-flop 226 will be "low," driving the input 228 to NAND gate 202 "low." NAND gate output 200, therefore, will be "high," causing input 198 to NAND gate 188 to be "high." The output 186 of NAND gate 188, therefore, will be "low" when transistor $Q_{11}$ is "off," enabling NOR gate 182. Further, the Q output of flip-flop 152 is initially "low" so that input 180 to NOR gate 182 is also "low." The output of NOR gate 182, then, will be "high," driving the input 192 to NAND gate 194 "high."

NAND gates 194 and 199 form a set/reset circuit similar in operation to the set/reset circuit formed by NAND gates 124 and 130 described above. Input 193 to NAND gate 194 is connected through resistor R44 to the + 5 volt supply. Accordingly, both inputs 192 and 193 of NAND gate 194 will be "high," causing NAND gate output 196 to go "low." NAND gate output 196 is connected to the input 197 of NAND gate 199. When NAND gate output 196 goes "low," so does NAND gate input 197, causing NAND gate output 201 to go "high," keeping NAND gate output 196 "low." When NAND gate output 196 is "low," so are the outputs 206 and 208 to NOR gates 210 and 212, respectively. NOR gates 210 and 212, therefore, are enabled when NAND gate output 196 is "low."

As already mentioned, inputs 214 and 216 to NOR gates 210 and 212, respectively, are connected together and to the output 218 of inverter 220. Inverter 220 is part of a circuit used for resetting the elements of circuits 10B and C when the circuits are initially connected to the power supplied. When the circuits are initially converted to the power supplies, the input 221 to inverter 220 is "low" because capacitor C25 has not yet charged. Accordingly, inverter output 218 is "high," causing the NOR gate outputs 224 and 226 to go "low." The "low" digital level at outputs 224 and 226 resets the flip-flops 94, 96 and 98 and the flip-flops 66 and 226, respectively. Moreover, when flip-flop 66 resets, its Q output is "low," causing flip-flop 152 to reset as well. As capacitor C25 charges to the + 5 volt supply, input 221 to inverter 220 goes "high," driving inverter output 218 "low." When inverter output 218 goes "low," so do NOR gate inputs 214 and 216, enabling NOR gates 210 and 212. Once the inverter input 221 goes "high," due to the carging of capacitor C25, it is maintained at the "high" level by inverter 222. That is, when inverter 221 goes "high," driving inverter output 218 "low," the output of inverter 222 goes "high." The output of inverter 222 is connected through resistor R45 to the input 221 of inverter 220. Accordingly, inverter 222 keeps the input 221 of inverter 220 "high" once capacitor 225 charges towards the + 5 volt supply sufficiently to drive inverter output 218 "low."

After the flip-flops have been reset, and inverter output 218 has gone "low," the signals 6, 7, 8 and 12345 are generated to selectively activate the expanders #1– #6. As already mentioned, if the signal combination 678 is generated, expander #6 is activated by decoder/driver 118, see Table 2. Assuming a tape reader scan rate of 20 cues per second, when the 678 signal combination is generated 30 millisec "low" pulses appear at the inputs 12, 28 and 88 to NOR gates 14, 26 and 90, respectively. During the duration of the "low" pulse at these NOR gate inputs, a 1 millisec "low" pulse appears at the output 34 of NAND gate 36, as already explained. Accordingly, NOR gates 14 and 26 generate 1 millisec "high" pulses at their ouputs 16 and 24, respectively. Consequently, NOR gate 20 generates a 1 millisec "low" pulse at its output 92. Since input 88 of NOR gate 90 is "low" at this time, NOR gate 90 generates a 1 millisec "high" pulse at its output 94. Nor gate outputs 16, 24 and 94 are connected, respectively, to the inputs 144, 142 and 140 of NAND gate 138. Inputs 144, 142 and 140 of NAND gate 138, therefore, will simultaneously go "high" for 1 millisec, causing a 1 millisec "low" pulse to appear at NAND gate output 146. The "low" 1 millisec pulse appearing at NAND gate output 146 is inverted by inverter 148 to a 1 millisec "high" pulse as inverter output 150.

Inverter output 150 is connected to the J input of flip-flop 66 and the D input of flip-flop 152. The K input of flip-flop 66 is permanently grounded. The clock inputs of flip-flops 66 and 152 are connected together to the output 154 of NOR gate 156. Input 164 of NOR gate 156 is connected to the output 108 of inverter 110. Input 158 of NOR gate 156 is connected to the output of inverter 160. The input 162 of inverter 160 is connected to the output 50 of NAND gate 52. Input 58 to NAND gate 52 is connected to the output 60 of inverter 62. The input 176 of inverter 162 is connected to the Enable Input terminal. As mentioned previously, when circuit 10 is connected as shown in FIG. 4, the Enable Input is "high." Accordingly, inverter output 60 will be "low," causing input 58 to NAND gate 52 to be "low." The output 50 of NAND gate 52, therefore, will be "high," causing inverter input 162 to go "high." Consequently, input 158 to NOR gate 156 will be "low," that is, NOR gate 156 will be enabled.

The 1 millisec "low" pulse at NOR gate output 92 and the 1 millisec "low" pulse at the collector of transistor Q9, previously described, cause NOR gate 86 to generate a 1 millisec "high" pulse at its output 114. This 1 millisec "high" pulse is differentiated and inverted by capacitor C18 and resistor R35 and inverter 110, respectively, as previously described, to produce a 100 microsec "low" pulse at inverter output 108. When the 100 microsec "low" pulse appears at the inverter output 108, it causes NOR gate 156 to generate a 100 microsec "high" pulse at its output 154. The 100 microsec "high" pulse at NOR gate output 154 clocks flip-flop 66. Since the J input of flip-flop 66 is "high" at this time, and its K input is "low," the Q output of flip-flop 66 goes "high." Flip-flop 66 may be a Texas Instruments 74107 dual J-K flip-flop with separate clear and clock inputs. The "high" pulse appearing at the NOR gate output 154 and the clock input to flip-flop 66 also appears at the clock input of flip-flop 152. Flip-flop 152 may be a Texas Instruments 7474 dual D-type positive edge-triggered flip-flop with separate clear and clock inputs. When the "high" 100 microsec pulse appears at the clock input of flip-flop 152, the D input of the flip-flop will be "high" due to the 1 millisec "high" pulse generated at the output 150 of inverter 148. The Q output of flip-flop 152, however, will not change from a "low" level to a "high" level in response to the positive edge of the 100 microsec "high" pulse at its clock input because the Q output of flip-flop 66 will be "low" when the positive edge appears. That is, the Q output of flip-flop 66 is connected to the reset input of flip-flop 152, and flip-flop 152 will remain reset despite the 100 microsec "high" pulse at its clock input.

When the Q output of flip-flop 66 goes "high," in response to the 100 microsec "high" pulse at its clock input, the $\overline{Q}$ output of flip-flop 66 goes "low." The $\overline{Q}$ output of flip-flop 66 is connected to the input 164 of NOR gate 166. The second input of NOR gate 166, input 168, is connected to the output 122 of NAND gate 124. As mentioned previously, the output 122 of NAND gate 124 goes "high" when the 100 microsec "low" pulse is generated at the output 108 of inverter 110. As a result, although the $\overline{Q}$ output of flip-flop 66 goes "low," the output 170 of NOR gate 166 will remain "low" due to NAND gate output 122.

When the Scan Clock input pulse at the input 82 to one-shot 78 returns to the "high" level, inverter 134 causes NAND gate 122 to go "low," as already explained. Accordingly, at this time, the output 170 of NOR gate 166 goes "high." The NOR gate output 170 is connected to the input of an inverter 172. The output 174 of inverter 172 is connected through resistor R48 to the base of transistor $Q_{13}$. When the NOR gate output 170 goes "high," the inverter output 174 goes "low," turning "off" transistor $Q_{13}$. The collector of transistor $Q_{13}$ is connected through resistor R49 to the + 9.1 volt supply. Accordingly, when transistor $Q_{13}$ turns "off," its collector rises to the + 9.1 volt level. The collector of transistor $Q_{13}$ is connected through resistor R50 to the In Use output. The In Use output, therefore, goes "high" at this time.

The In Use output is connected to a succeeding circuit 10 when the circuits 10 are connected in cascade as shown in FIG. 5. The function of the In Use output will be described in greater detail hereinafter with reference to the cascade connection of circuits 10 shown in FIG. 5.

When the second consecutive 678 signal combination is generated, a 1 millisec "high" pulse is again generated at the output 150 of inverter 148. This pulse appears at the J input of flip-flop 66 and the D input of flip-flop 152. In addition, a 100 microsec "high" pulse is again generated at the output 154 of NOR gate 156. This pulse appears at the Clock inputs of flip-flops 66 and 152. When the 100 microsec "high" pulse appears at the Clock inputs of fli-flops 66 and 152, the Q output of flip-flop 66 is "high" since flip-flop 66 has already been clocked once by a 100 microsec "high" pulse, as previously explained. Flip-flop 66, therefore, does not change states when it is clocked a second time with its J input at a "high" level. That is, when flip-flop 66 is clocked a second time, its Q output is already "high" and cannot change.

In contrast, when flip-flop 152 is clocked a second time, its Q output will change from a "low" to a "high." More specifically, when flip-flop 152 is clocked a second time, its D-input will be "high," its Q output will be "low," and its reset input will be "high." The reset input of flip-flop 152 will be "high" because it is connected to the Q output of flip-flop 66. Thus, a second 100 microsec "high" pulse at the Clock input of flip-flop 152 will cause the Q output of the flip-flop to change from a "low" level to a "high" level.

The Q output of flip-flop 152 is connected to the input 180 of NOR gate 182. As already mentioned, the input 190 to NAND gate 188 will be "high" when circuit 10 is connected as shown in FIG. 4. The input 198 of NAND gate 188 is connected to the output 200 of NAND gate 202. The input 228 to NAND gate 202 is connected to the Q output of flip-flop 226. The J input of flip-flop 226 is connected by line 232 to the output 234 of NOR gate 236. The input 238 to NOR gate 236 is connected, through line 40, to the output 42 of transistor $Q_7$. As previously explained, when circuit 10 is in use, the output 42 of transistor $Q_7$ will be "high." As a result, the input 238 to NOR gate 236 will be "high," driving the output 234 of NOR gate 234 "low." The J input of flip-flop 226, then, will remain "low" throughout the operation of circuit 10 when circuit 10 is connected as shown in FIG. 4. Since the J input of flip-flop 226 remains "low," its Q output also remains "low." The output 200 of NAND gate 202, therefore, will be "high," keeping the input 198 to NOR gate 188 "high." The output 186 of NAND gate 188, therefore, will be "low," enabling NOR gate 182.

When the flip-flop 152 is clocked a second time, its Q output changes from a "low" to a "high," as previously explained. This causes the input 180 to NOR gate 182 to go from a "low" to a "high," driving the input 192 to NAND gate 194 "low." The output 196 of NAND gate 194, therefore, goes "high" driving the outputs 224 and 226 of NOR gates 210 and 212, respectively, "low." Accordingly, Nor gates 210 and 212 reset flip-flops 94, 96 and 98 and flip-flops 66, 226 and 152. Moreover, when the Scan Clock input pulse returns to a "high" level, and NAND gate output 122 enables decoder/drivers 118 and 120, the $P_2$, $P_b$, and $P_c$ inputs to the decoder/drivers will be "low," causing the decoder/driver outputs $\overline{Q}_1$-$\overline{Q}_6$ to go to + 24 volts. The decoder/driver 118 outputs, therefore, will open relays S1-S6 to de-activate expanders #1- #6.

In summary, then, if two consecutive 678 signal combinations are generated, expander #6 is activated in response to the first 678 signal combination, and circuits 10B and 10C are reset in response to the second 678 signal combination. When circuit 10B is reset, each of the expanders #1- #6 is de-activated.

When the Scan Clock input pulse returns to a "high" level, after the Q output of flip-flop 152 goes "high" to cause NOR gates 210 and 212 to reset the flip-flops, the inverted Scan Clock input pulse appearing at the output of inverter 134 goes "low," causing NAND gate output 201 to go "high." After the flip-flops have been reset, the Q output of flip-flop 152 will be "low," causing the NOR gate 180 to be "low." Since the input 184 to NAND gate 182 is also "low," as previously explained, the output of NOR gate 182 will be "high," driving the input 192 to NAND gate 194 "high." NAND gate output 196, therefore, returns to a "low" level. When NAND gate output 196 returns to a "low" level, NOR gate outputs 224 and 226 go "high," disabling the reset inputs of flip-flops 94, 96 and 98 and flip-flops 66 and 226. The reset input of flip-flop 152, however, is not disabled at this time since it is connected to the Q output of flip-flop 66. Since flip-flop 66 has been reset, its Q output keeps the reset input of flip-flop 152 "low."

When the NAND gate output 196 goes "high," after the Q output changes from a "low" level to a "high" level in response to the second 100 microsec "high" pulse appearing at its clock input, NAND gate 196 triggers a retriggerable one-shot 240 to generate a "low" pulse at the Reset Output of circuit 10C. One-shot 240 may comprise a Texas Instruments 74123 dual retriggerable one-shot with separate reset and trigger inputs. Resistor R51 and capacitor C27 are connected to the one-shot to generate a pulse of approximately 5 millisec duration at the Q output of the one-shot. It should be understood, that elements R51 and C27 are part of the one-shot 240.

More specifically, the output 196 of NAND gate 194 is connected to the input 242 of one-shot 240. When the output 196 of NAND gate 194 goes "high," it triggers one-shot 240. In response, one-shot 240 generates a "high" 5 millisec pulse at its Q output. The Q output of one-shot 240 is connected to the base of a transistor 214 through a resistor R52. When the base of transistor $Q_{14}$ is driven "high" by the Q output of one-shot 240, transistor $Q_{14}$ turns "on." Accordingly, the collector of transistor $Q_{14}$ drops to 0 volts. The collector of transistor $Q_{14}$ is connected through resistor R55 to the Reset Output. The Reset Output, therefore, goes from a "high" to a "low" level when transistor $Q_{14}$ turns "on." When one-shot 240 times out, after 5 millisec, its Q output drives the base of transistor $Q_{14}$ "low," causing transistor $Q_{14}$ to turn "off." As a result, the collector of transistor $Q_{14}$ goes "high," driving the Reset Output "high." The function of the Reset Output is explained in greater detail hereinafter with respect to the cascade connection of circuits 10 as shown in FIG. 5.

Figure 6:
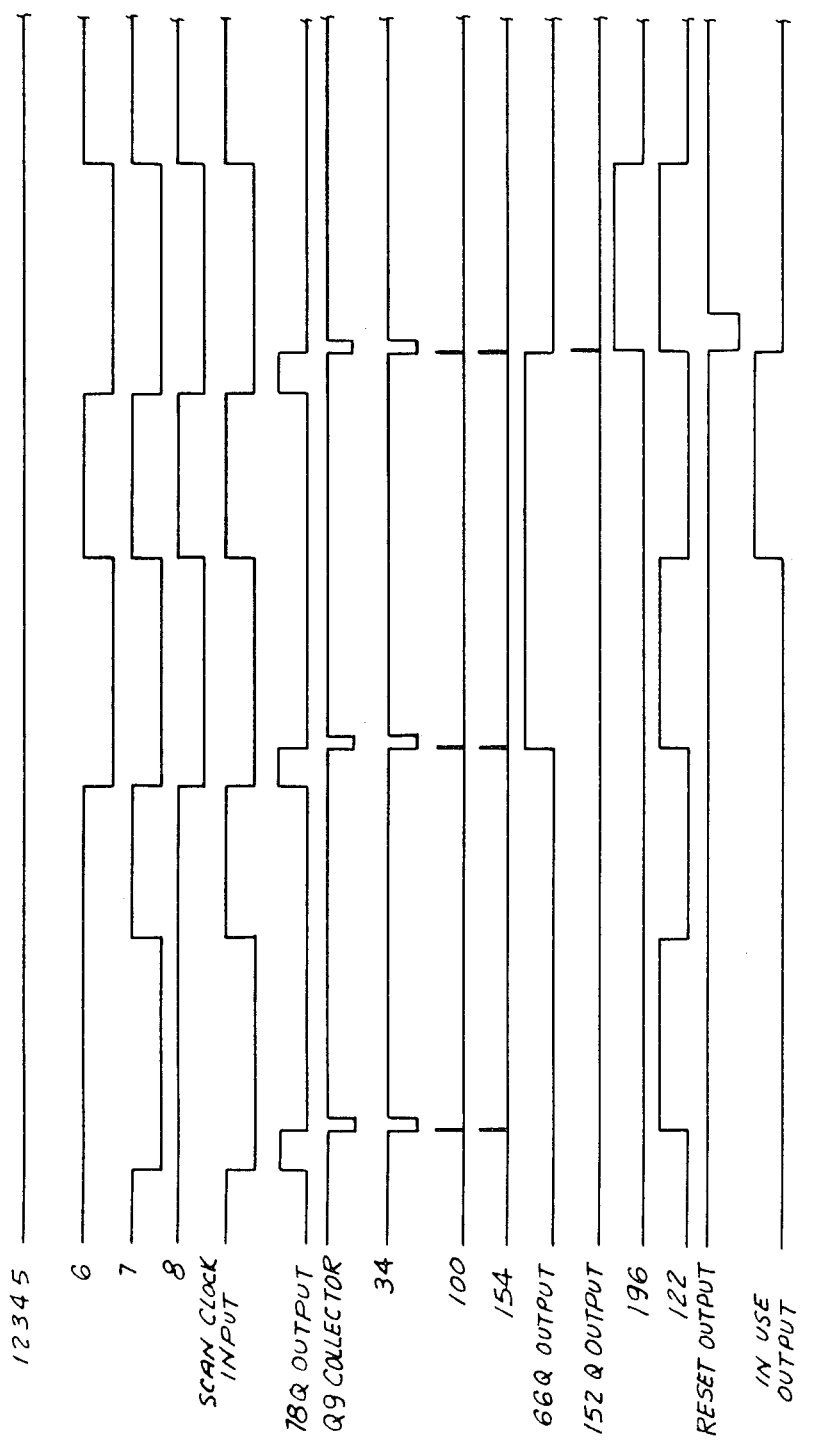
FIG. 6 is a timing diagram showing various signals developed in the circuit constructed in accordance with the principles of the present invention and connected as shown in FIG. 4.

The waveforms of the signals generated at particular points of the circuit 10, when the circuit is connected to the programmer and expanders as shown in FIG. 4, are furnished in FIG. 6 for the two signal combinations described in the foregoing disclosure, namely, the signal combination 7 and the consecutive signal combinations 678.

The foregoing description of the present invention pertains to its operation when connected to a programmer and a plurality of expanders as shown in FIG. 4. The invention, however, can also operate to expand the channel capacity of the programmer when connected as shown in FIG. 5. In FIG. 5, a plurality of circuits 10 are connected in cascade to each other and to a plurality of expanders. When connected as shown in FIG. 5, the channel capacity of the programmer can be expanded by a factor of 40 times $(n-1)m+8$ or $5(n-1)m$, assuming that each expander has a 40 channel output capacity and that the programmer is an 8 channel programmer. In operating the cascade circuit shown in FIG. 5, only one circuit 10 is activated at any given instant of time.

Referring to the cascade connection shown in FIG. 5, each of the circuits 10 is connected to the programmer channel register outputs 1'-8' and the Scan Clock, as previously described. In addition, the T input terminal, see FIG. 2, of the first circuit 10 is grounded, the In Use input of the first circuit 10 is floating (by floating, it is meant that the input terminal is not connected to any external circuitry, as already explained), and the Reset Input of the first circuit 10 is connected to the Reset output of the second circuit 10. Further, the output #6 of each circuit 10 is floating, and the Power In input of each circuit 10 is connected to a + 24 volt source located in the programmer. Each of the outputs #1- #5 of each circuit 10 is connected to one of five expanders. The Reset Output of the first circuit 10 is floating.

With regard to the second circuit 10, its T input terminal is connected to ground, its In Use input is connected to the In Use output of the first circuit 10, and its Reset Input is connected to the Reset Output of the third circuit 10 (not shown).

The connections of the inputs of the mth circuit 10 to the outputs of the (m-1)th circuit 10 are the same as the connections of the second circuit 10 inputs to the first circuit 10 outputs with the exception that the T input, Reset Input, and output #6 of the mth circuit 10 are floating.

The Power In input of the first circuit 10 is connected to a + 24 volt power source in the programmer. When the circuits 10 are initially connected in cascade as shown in FIG. 5, then, the first circuit 10 will be in use while the other circuits 10 will not. Accordingly, various combinations of the signals 6, 7, 8 and 12345 will activate particular expanders connected to the first circuit 10, one at a time. When, however, the first signal combination 678 is generated, the In Use lamp of the first circuit 10 is extinguished. In addition, the In Use output of the first circuit 10 will go "high," causing the In Use lamp of the second circuit 10 to go "on." When the second signal combination 678 is generated, the In Use lamp of the second circuit 10 goes "off" and the In Use output of the second circuit 10 goes "high," turning the In Use lamp of the third circuit 10 "on." As shown in Table 3, below, when a circuit 10 receives a 678 signal combination, the circuit is turned "off" and the following circuit 10 is turned "on." When the next 678 signal combination is received by the following circuit which has been turned "on," that circuit is turned "off" and the next circuit 10 is turned "on." As more 678 signal combinations are generated, successive circuits 10 are turned "on" and "off." When the mth 678 signal combination is received by the mth circuit 10, the mth circuit 10 turns "off" and resets the (m-1)th circuit 10. The (m-1)th circuit 10 then resets the (m-2)th circuit 10, and, ultimately, the second circuit 10 will be reset and will reset, in turn, the first circuit 10. Thus, the mth 678 signal combination causes all m of the circuits 10 shown in FIG. 5 to be reset.

TABLE 3

| Sequence of 678 Signal Combinations | States of m Circuits 10 | | | | |
|---|---|---|---|---|---|
| | 1 | 2 | 3 | ... | m |
| No Signal 678 | On | Off | Off | ... | Off |
| First Signal 678 | Off | On | Off | ... | Off |
| Second Signal 678 | Off | Off | On | ... | Off |
| . | . | . | . | | . |
| . | . | . | . | | . |
| . | . | . | . | | . |
| (m-1)th Signal 678 | Off | Off | Off | ... | On |
| mth Signal 678 | On | Off | Off | ... | Off |

The 678 signal combination listed in Table 3 may be separated by other signal combinations such as 6, 7, 67 and so forth for energizing particular expanders connected to a circuit 10 which is "on." Although a 678 signal combination has been described as switching each of the circuits 10 on and off, it should be understood that the present invention can be modified to respond in the same manner to other signal combinations.

As previously mentioned, when the circuits 10 are initially connected in cascade as shown in FIG. 5, the In Use lamp of the first circuit 10 will be "on" while the In Use lamps of all other circuits 10 will be "off." Power is supplied by the programmer to the Power In input of each circuit 10.

The T input of the first circuit 10 is grounded when the circuits 10 are connected in cascade as shown in FIG. 5. As a result, the relay S7 in the first circuit 10 will be closed and the Enable Input will be "low." The inverter output 60, therefore, will be "high," enabling NAND gate 52 and disabling NOR gate 236. When NOR gate 236 is disabled, its output 234 is "low," keeping the J input of flip-flop 226 "low." The Q output of flip-flop 226, then, will be "low," disabling NAND gate 202. The NAND gate output 200, then, will stay "high."

As shown in FIG. 5, the reset input of the first circuit 10 is connected to the reset output of the second circuit 10. When the second circuit 10 is "off," its Reset output will be "high." The reset input of the first circuit 10, then, will also be "high," causing the NAND gate input 190 to be "high." The NAND gate output 186, then, will be "low," enabling NOR gate 182. As previously explained, NOR gate 182 controls the set/reset circuit comprised of NAND gates 194 and 199. The set/reset circuit comprised of NAND gates 194 and 199 controls the NOR gates 210 and 212. The NOR gates 210 and 212, when triggered, reset flip-flops 94, 96 and 98 and flip-flops 66, 226 and 152. With NOR gate input 184 "low," the NOR gates 210 and 212 can reset the flip-flops in response to a "high" signal appearing at NOR gate input 180. NOR gate input 180 is connected to the Q output of flip-flop 52. Thus, a "high" signal appearing at the Q output of flip-flop 952 would reset circuit 10. However, as will be shown hereinafter, flip-flop 152 is prevented from setting, that is, its Q output is prevented from going "high," once the 678 signal combination is received by the circuit 10 including that flip-flop. Consequently, only a "low" signal appearing at the Reset Input of the circuit will reset the circuit.

When the signal combinations shown in Table 2 above are generated, the first circuit 10 will control the expanders #1- #5 as previously explained. A sixth expander is not connected to the circuits 10 in FIG. 5 to avoid simultaneous operation of more than one expander when a 678 signal is generated. The In Use input of the first circuit 10 is floating. Accordingly, the output 42 of transistor $Q_7$ will be "high" and the In Use lamp will be "on." Additionally, since output 42 is "high," NAND gate input 38 will be enabled and NOR gates 14, 26, and 90 will respond to the signals 6, 7 and 8. When the first 678 signal combination is received by the first circuit 10, a 100 microsec "high" pulse is generated at the inverter output 150 as already explained. The 100 microsec "high" pulse clocks flip-flop 66, causing the Q output of the flip-flop to go "high." The Q output of flip-flop 66 is connected to the NAND gate input 56. When the Q output of flip-flop 66 goes "high," it enables NAND gate 52. Since inverter output 60 is "high" at this time, NAND gate output 50 will go "low." When NAND gate output 50 goes "low," it disables NAND gate 36 and the peripheral driver 46. When the peripheral driver 46 is disabled, the In Use display lamp for the first circuit 10 is extinguished.

When NAND gate 36 is disabled, its output 34 stays "high," disabling NOR gates 14 and 26. When NOR gates 14 and 26 are disabled, they will not respond to the signals 6 7, respectively. Moreover, when NOR gates 14 and 26 are disabled, the NOR gate outputs 16 and 24 will be "low." The NOR gate output 92, therefore, will be "high," disabling NOR gate 90. When NOR gate 90 is disabled, it will not respond to the signal 8 appearing at its input 88. Thus, when NAND gate 36 is disabled, the first circuit 10 will not respond to the signals 6, 7, and 8. Accordingly, when the first 678 signal combination is received by the first circuit 10, flip-flop 66 is set, that is, the Q output of flip-flop goes "high," the first circuit 10 no longer responds to the signals 6, 7, and 8, and the In Use display lamp of the first circuit 10 is extinguished. Since the circuit will not respond to further signals 6, 7 and 8, flip-flop 152 is prevented from setting, that is, its Q output is prevented from going "high." As a result, only a "low" pulse at the Reset Input of the circuit will cause the circuit to be reset.

Moreover, when the first 678 signal combination is received by the first circuit 10, the $\bar{Q}$ output of the flip-flop 66 and the first circuit 10 goes "low," driving the NOR gate input 164 "low." The NOR gate input 168 is connected to the NAND gate output 122 in the set/reset circuit comprised of NAND gates 124 and 130. Since the NAND gate output 122 goes "low" when the Scan Clock input pulse expires, as previously explained, NOR gate input 168 will go "low" and NOR gate 170 will go "high," causing transistor $Q_{13}$ to turn "off." The In Use output of the first circuit 10, therefore, goes "high" when the Scan Clock input pulse and the first signal combination 678 expire. When the In Use output of the first circuit 10 goes "high," it drives the In Use input of the second circuit 10 "high," causing the In Use display lamp of the second circuit 10 to turn "on."

In summary, then, the first 678 signal combination turns the first circuit 10, including its In Use Display lamp, "off," while causing the second circuit 10, including its In Use display lamp, to turn "on." All other circuits 10 remain "off." This condition for the cascade connection shown in FIG. 5 is supplied in Table 3 above.

When the second circuit 10 is turned "on," its NOR gates 14, 26 and 90 will respond to the signals 6, 7 and 8, as previously described. In particular, the second circuit 10 will receive the second signal combination 668 whenever it is generated. When the second signal combination 678 is received by the second circuit 10, the second circuit 10 will turn "off" and the third circuit 10 will turn "on."

The T input of the second circuit 10 is connected to ground. As a result, the Enable input of the second circuit 10 will stay "low," and the inverter output 60 will stay "high," disabling NOR gate 236. The J input of flip-flop 226, therefore, will stay "low," as will the Q output of the flip-flop. The NAND gate output 200, therefore, will stay "high," keeping NAND gate input 198 "high."

The reset input of the second circuit 10 is connected to the reset output of the third circuit 10 (not shown). When the third circuit 10 is "off," its reset output is "high." Since the reset output of the third circuit 10 is "high," so is the reset of the second circuit 10. Consequently, the NAND gate input 190 will be "high." Since both NAND gate inputs 198 and 190 are "high," NAND gate output 186 will be "low," enabling NOR gate 182. The NOR gates 210 and 212, then, would reset the flip-flops in the second circuit 10 when the Q output of flip-flop 152 goes "high." However, the Q output of flip-flop 152 is prevented from going "high," as previously explained, once the third circuit 10 receives a 678 signal combination, since the circuit will not respond to signals 6, 7 or 8 thereafter. The circuit, therefore, can only be reset by a "low" pulse at its Reset Input.

When the second 678 signal combination is received by the second circuit 10, the $\bar{Q}$ output of flip-flop 66 goes "low," driving input 164 to NOR gate 166 "low." In addition, when the Scan Clock input pulse expires, NAND gate output 122 goes "low," as previously explained, driving the input 168 to NOR gate 166 "low." NOR gate 170, therefore, goes "high," causing transistor $Q_{13}$ to turn "off." When transistor $Q_{13}$ turns "off," the In Use output of the second circuit 10 goes "high." When the In Use output of the second circuit 10 goes "high," it drives the In Use input of the third circuit 10 "high," causing the In Use display lamp in the third circuit 10 to go "on."

The third circuit 10 will go "on" when the second signal combination 678 is received by the second circuit 10. Further combinations of the signals 6, 7 and 8 will be processed by the third circuit 10, all other circuits 10 now being "off."

The third circuit 10 will rpocess the signals 6, 7 and 8 until the third signal combination 678 is received. When the third circuit 10 receives the third signal combinations 678, the circuit 10 turns "off" and the fourth circuit 10 turns "on." Succeeding circuits 10 in the cascade connection shown in FIG. 5 are turned "on" and "off" in response to succeeding signal combinations 678 in accordance with the operation described above. When the (m-1)th signal combination 678 is rerceived by the (m-1)th circuit 10 (not shown), the (m-1)th circuit 10 turns "off" and the mth circuit is turned "on." The mth circuit 10 will control the expanders #1- #5 connected thereto in accordance with the operation of circuit 10 previously described. When, however, the mth 678 signal combination is receibed by the mth circuit 10, the circuit resets its flip-flops and generates a "low" pulse as its reset output. The "low" pulse at the Reset output of the mth circuit 10 is transmitted to the reset input of the (m-1)th circuit, causing the flip-flops of the (m-1)th circuit to be reset and further causing a "low" pulse to appear at the reset output of the (m-1)th circuit 10. The "low" pulse at the Reset output of the (m-1)th circuit 10 causes the flip-flops of the (m-2)th circuit 10 (not shown) to be reset, and, ultimately, the "low" pulse appearing at the Reset output of the third circuit 10 causes the flip-flops of the second circuit 10 to be reset, and the "low" pulse appearing at the Reset output of the second circuit 10 causes the flip-flops of the first circuit 10 to be reset. Thereafter, all of the m circuits 10 except the first circuit 10 will be "off," that is, all of the circuits 10 shown in FIG. 5 except the first will not respond to the signals 6, 7 and 8.

The mth 678 signal combination, then, turns "off" the mth circuit 10, all other circuits 10 having been turned "off," and causes the flip-flops of all the circuits 10 in the cascade to be reset. When the flip-flops of the first circuit 10 are reset, the Q output of flip-flop 66 goes "low," disabling NAND gate 52 and, thereby, enabling NAND gate 36. With NAND gate 36 enabled, the NOR gates 14, 26 and 90 of the first circuit 10 will respond to the signal 6, 7 and 8 as they are generated by the programmer, and the operation of the cascade connection, described above, can be repeated.

More specifically, when the mth 678 signal combination is received by the mth circuit 10, the Q output of flip-flop 66 will go "high," driving the input 204 to NAND gate 202 "high." In addition, since the T input of the mth circuit 10 is floating, see FIG. 5, the Enable input of the circuit will be "high." As a result, the NAND gate input 230 will be "high." The J input of flip-flop 226 is connected to the NOR gate output 234. NOR gate 236 is enabled when the Enable input is "high," that is, NOR gate input 239 is "low." The second input to NOR gate 236, input 238, is connected to the transistor output 42. Transistor output 42 will be "low" when transistor $Q_7$ is "on." Transistor $Q_7$ will turn "on" when transistor $Q_8$ turns "on." Transistor $Q_8$ will turn "on" when the In Use output of the (m-1)th circuit 10 goes "high" in response to the (m-1)th 678 signal combination. Therefore, when the mth circuit 10 is "on," the NOR gate input 238 will be "low." Accordingly, the NOR gate output 234 will be "high," driving the J input of flip-flop 226 "high." When any combination of the signals 6, 7 and 8, including the signal combination 678, is received by the mth circuit 10, the 1 millisec "high" pulse appearing at the inverter output 74 is transmitted by line 73 to the Clock input of flip-flop 226. The 100 millisec "high" pulse, therefore, clocks the flip-flop 226, causing the Q output of the flip-flop to go "high." When the Q output of flip-flop 226 goes "high," so does the input 228 to NAND gate 202. The NAND gate output 200, therefore, goes "low," causing the output 186 of NAND gate 188 to go "high." When the NAND gate 186 goes "high," it drives the output of NOR gate 182 "high," further causing the output 196 of NAND gate 194 to go "high." Consequently, the outputs 224 and 226 of NOR gates 210 and 212, respectively, go "low," resetting flip-flops 94, 96 and 98 and flip-flops 66, 226 and 152 in the mth circuit 10.

It should be appreciated that, for all circuits 10 except the mth circuit 10, the Q output of flip-flop 226 will be "low" because the J input of the flip-flop will be "low" due to a "low" signal at the Enable Input of the circuit. As already explained, the Enable Input will be "low" if the T input is grounded. The T input of all circuits 10 except the mth circuit are grounded as shown in FIG. 5. Accordingly, for all circuits 10 except the mth circuit, the NAND gate 202 will be disabled and the circuit will not be reset except in response to a "low" signal at its Reset Input.

When the output 196 of NAND gate 194 in the mth circuit 10 goes "high," it triggers one-shot 240 which generates a "high" pulse of approximately 5 millisec duration at its Q output. The 5 millisec "high" pulse at the Q output of one-shot 240 drives the transistor $Q_{14}$ "on," causing the Reset output of the mth circuit 10 to go "low."

When the Reset output of the mth circuit 10 goes "low," it drives the Reset Input of the (m-1)th circuit 10 "low." The transistors $Q_{12}$ and $Q_{11}$ and the (m-1)th circuit 10, therefore, turn "on." When the transistor $Q_{11}$ turns "on," it drives the input 190 to NAND gate 188 "low." Since the Q output of flip-flop 226 and the (m-1)th circuit is always "low," as previously explained, the NAND gate output 200 will be "high," driving the input 198 to NAND gate 188 "high." When the NAND gate input 190 goes "low," therefore, the NAND gate output 186 goes "high," causing NOR gate 182 to drive the input 192 of NAND gate 194 "low." In response, NAND gate 194 generates a "high" signal at its output 196, causing NOR gates 210 and 212 to reset flip-flops 94, 96 and 98 and flip-flops 66, 226 and 152. In addition, when NAND gate 194 generates a "high" signal at its output 196, it triggers one-shot 240. Accordingly, a "low" pulse of approximately 5 millisec duration appears at the reset output of the (m-1)th circuit 10.

The flip-flops of the m circuits 10 are sequentially reset according to the operation described above. When the flip-flops of the first circuit 10 are reset, the NOR gates 14, 26 and 90 are enabled, since the In Use input of the first circuit 10 is floating, causing NAND gate input 40 to be "high." In contrast, the In Use inputs of the remaining circuits 10 will be "low" so that NAND gate input 40 will be "low," causing NAND gate output 34 to be "high." When NAND gate output 34 is "high," it disables NOR gates 14 and 26 and the circuit 10 will not respond to the 6, 7, 8 signals. Therefore, when the mth 678 signal combination causes all the flip-flops in the cascade connection of the circuits 10 shown in FIG. 5 to be reset, all the circuits 10 will be "off" except for the first circuit 10. This condition is shown in the last row of Table 3, above.

Figure 7:
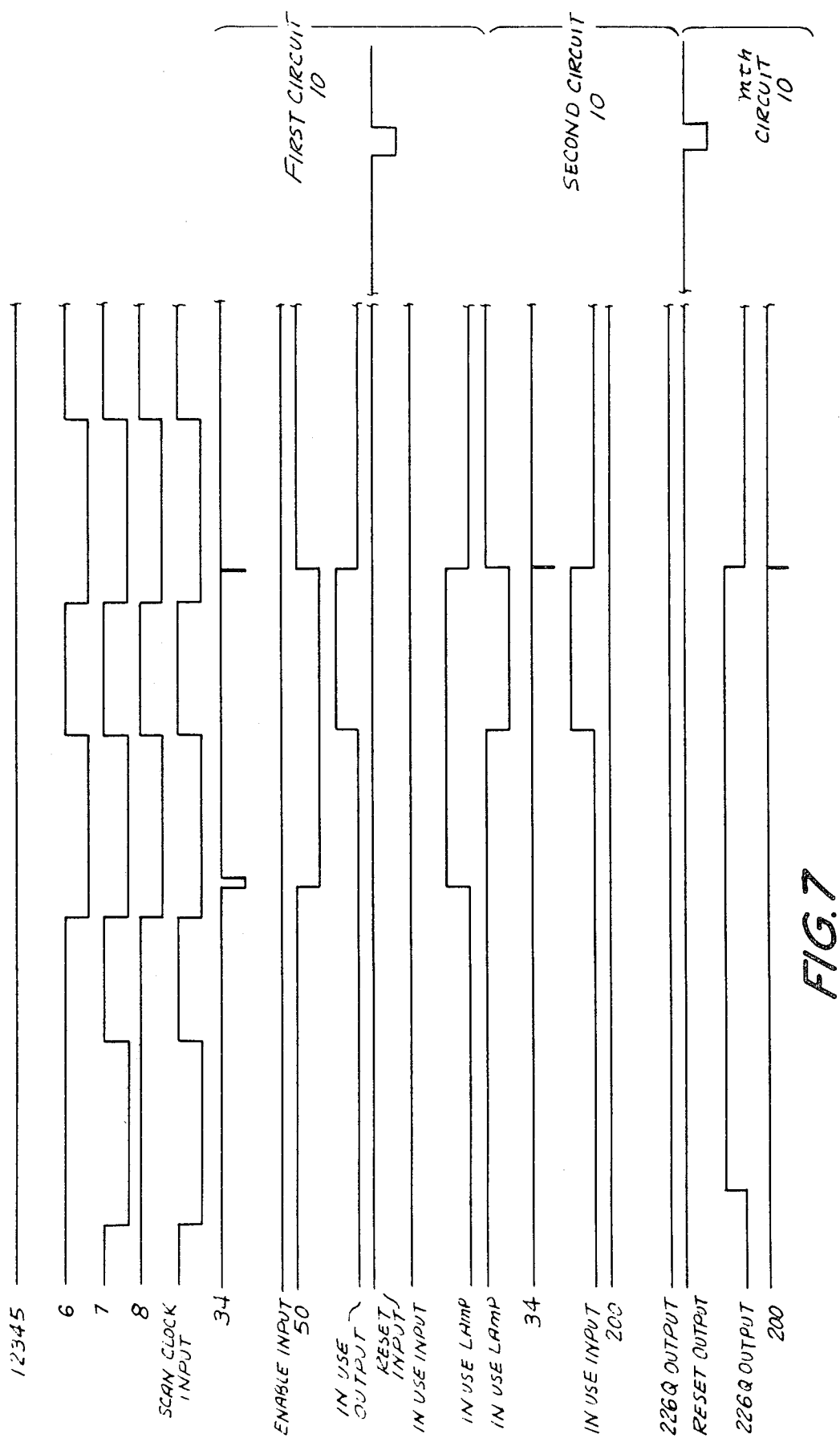
FIG. 7 is a timing diagram showing various signals developed in the circuit constructed in accordance with the principles of the present invention and interconnected as shown in FIG. 5.

The waveforms of the signals generated at particular points of the circuits 10, as connected according to FIG. 5, are shown in FIG. 7 for the two signal combinations, 7 and 678, appearing in FIG. 6.

Assuming a forty channel expander and an eight channel programmer, with the circuits 10 interconnected as shown in FIG. 5, the channel output capacity of the programmer can be expanded by a factor of m times $(n-1)40 \div 8$ or $5m(n-1)$. Using the connection of circuit 10 shown in FIG. 4 the increase in channel output capacity is less, namely, n times $50 \div 8$ to $5n$. Either connection, however, is a marked improvement over the increase in channel output capacity provided by a single expander, namely, a factor of $40 \div 8$ or 5.

Hereinafter, by way of description of the invention in the following Claims, certain of the signals generated in the present invention and described above will be referred to according to their function. For example, the signal generated by the transistor $Q_7$ at its output 42 enables the NAND gate 36 to allow the NOR gates 14, 26 and 90 to respond to the 6, 7 and 8 signals. This signal, therefore, may be referred to as an enabling signal. In addition, the signal generator at the NAND gate output 122 enables the decoder/drivers 118 and 120 and also may be referred to as an enabling signal. By way of further example, the signals generated by NOR gate 102, NOR gate 154, and transistor $Q_9$ provide the timing necessary for the operation of the elements of each circuit 10. Accordingly, these signals may be referred to as timing signals. Further, the signal generated at inverter output 148 serves to trigger the reset operation of the circuit 10. This signal, then, may be referred to as a reset signal.

It should also be appreciated that, although in the preceding description, the circuits 10 were turned "on" and "off" in response to information in the sixth, seventh and eighth channels of the tape — as indicated by the signal combination 678 — this information can be inserted in other channels of the tape instead. Thus, the predetermined information for turning the circuit 10 "on" and "off" may be contained in channels other than the sixth, seventh and eighth channels of the tape. In that case, the circuit 10 can be modified, within the spirit and scope of the invention, to respond to the predetermined information in the chosen channels.

Finally, although in the foregoing description certain signals have been specified to occur at predetermined time durations, the present invention is not limited to those particular time durations, and the signals may persist for other time durations within the spirit and scope of the invention.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for expanding the channel output capacity of a programmer having a plurality of output channels for controlling the states of a plurality of channel expander devices, said programmer including a Scan Clock, means for automatically reading stored information at a preselected rate set by said Scan Clock, and means of generating information in said plurality of programmer output channels indicative of such stored information, comprising:
   means for generating a first enabling signal;
   means for detecting information in the output channels of said programmer in response to said first enabling signal and for generating a set of output signals in response to said programmer output channel information;
   timing means for generating a first timing signal in response to said Scan Clock;
   first means connected to said detecting means and said timing means for storing said set of output signals in response to said first timing signal;
   means for generating a second enabling signal in response to said Scan Clock; and
   means connected to said first storage means and to said second enabling signal generating means for energizing one of said channel expander devices in response to said stored set of output signals and said second enabling signal.

2. Apparatus according to claim 1 including means connected to said first enabling signal generating means for indicating that first enabling signal is being generated.

3. Apparatus according to claim 1 wherein said timing means includes means for generating a second timing signal in response to said Scan Clock and said means for detecting information includes means for generating a reset signal in response to predetermined information in said programmer output channels, further including means connected to said reset signal generating means for resetting said first storage means in response to said reset signal and said second timing signal.

4. Apparatus according to claim 3 wherein said reset signal includes first and second digital pulses, said second timing signal includes first and second digital pulses, and said means for resetting includes:
   second means connected to said means for detecting information and said timing means for storing said first digital pulse of said reset signal in response to said first digital pulse of said second timing signal;
   third means connected to said means for detecting information and said timing means for storing said second digital pulse of said reset signal in response to said second digital pulse of said second timing signal; and
   means connected to said third storage means for resetting said first, second and third storage means in response to said third storage means storing said second digital pulse of said reset signal.

5. Apparatus according to claim 1 wherein said means for detecting information is a digital logic gating network.

6. Apparatus according to claim 1 wherein said timing means includes:
   a one-shot for generating a one-shot pulse having a predetermined time duration in response to said Scan Clock;
   means for differentiating said one-shot pulse; and
   digital logic gating means for producing said first timing signal in response to said differentiated one-shot pulse.

7. Apparatus according to claim 1 wherein said first means for storing includes a set of three flip-flops for storing said set of output signals, each of said flip-flops having an output and a Clock input, the Clock inputs of the three flip-flops being connected together to said timing means; and wherein said energizing means includes a first decoder/driver provided with three data inputs, each data input of said first decoder/driver being connected to one of said flip-flop outputs.

8. Apparatus according to claim 7 including means connected to said set of three flip-flops for indicating which channel expander device is energized.

9. Apparatus according to claim 8 wherein said indicating means includes a second decoder/driver provided with three data inputs, each data input of said second decoder/driver being connected to one of said flip-flop outputs.

10. Apparatus according to claim 1 wherein said second enabling signal generating means includes a set/reset circuit comprising two interconnected NAND gates.

11. Apparatus for expanding the channel output capacity of a programmer having a plurality of output channels for controlling the states of a plurality of channel expander devices, said programmer including a Scan Clock, means for automatically reading stored information at a preselected rate set by said Scan Clock, and means for generating information in said plurality of programmer output channels indicative of said stored information, comprising a plurality of interconnected circuits, each of said circuits including:
   an in use input terminal and an in use output terminal, said in use output terminal of each circuit, except the last circuit, being connected to the in use input terminal of the next adjacent circuit, the in use input terminal of the first circuit not being connected to the in use output terminal of any said circuit;
   means for generating a first enabling signal indicating that the circuit is in use when a first predetermined digital signal appears at the in use input terminal;
   means for detecting information in the output channels of said programmer and for generating a set of output signals in response to said programmer output channel information and said first enabling signal;
   timing means for generating first, second and third timing signals in response to said Scan Clock;
   first means connected to said detecting means and said timing means for storing said set of output signals in response to said first timing signal;
   means for generating a second enabling signal in response to said Scan Clock;
   means connected to said first storage means and said second enabling signal generating means for energizing one of said channel expander devices in response to said stored set of output signals and said second enabling signal;

means for generating a reset signal in response to predetermined information in said programmer output channels;

means connected to said reset signal generating means for disabling said means for detecting information in response to said reset signal and said second timing signal;

means connected to said reset signal generating means and said timing means for generating said first predetermined digital signal at said in use output terminal in response to said reset signal and said second timing signal;

a reset input terminal and a reset output terminal, said reset output terminal of each circuit, except the first circuit, being connected to the reset input terminal of the next adjacent circuit, and the reset input terminal of the last circuit not being connected to the reset output terminal of any said circuit;

means for resetting said first storage means when a second predetermined digital signal appears at said reset input terminal;

said last circuit including means connected to said reset signal generating means in said last circuit for resetting said first storage means in response to said reset signal and said third timing signal;

said last circuit including means connected to said resetting means for generating said second predetermined digital signal at its reset output terminal in response to said reset signal and said third timing signal; and means for generating said second predetermined digital signal at said reset output terminal in response to said second predetermined digital signal appearing at said reset input terminal.

12. Apparatus according to claim 11 wherein said last circuit resetting means includes a first flip-flop connected to said timing means, a second flip-flop connected to said timing means and said reset signal generating means, and a NAND gate connected to said first and second flip-flops.

13. Apparatus according to claim 11 including means connected to said first enabling signal generating means for indicating that said first enabling signal is being generated.

14. Apparatus according to claim 11 wherein said means for detecting information is a digital logic gating network.

15. Apparatus according to claim 11 wherein said timing means includes a one-shot for generating a one-shot pulse having a predetermined time duration in response to said Scan Clock;

means for differentiating said one-shot pulse; and digital logic gating means for producing said first timing signal in response to said differentiated one-shot pulse.

16. Apparatus according to claim 11 wherein said first means for storing includes a set of three flip-flops for storing said set of output signals, each of said flip-flops having an output and a clock input, the clock inputs of the three flip-flops being connected together to said timing means, and wherein said energizing means operates in response to said flip-flop outputs.

17. Apparatus according to claim 12 wherein said means for generating said first predetermined digital signal at said In Use output terminal includes a NOR gate connected to said first flip-flop and said second enabling signal generating means.

18. Apparatus according to claim 11 wherein said second enabling signal generating means includes a set/reset circuit comprising two interconnected NAND gates.

19. Apparatus according to claim 11 wherein said last circuit means for generating said second predetermined digital signal includes a one-shot.

20. Apparatus for expanding the channel output capacity of a programmer by controlling the operating states of a plurality of channel expander devices, said programmer including a storage medium containing first and second predetermined information, comprising:

a pluality of interconnected circuits, each of said circuits being connected to a plurality of said channel expander devices for controlling the operating states of the same;

means connected to said programmer for generating a first sequence of digital signals in response to said predetermined information contained in said programmer storage medium;

means connected to said programmer for generating a second sequence of digital signals in response to said second predetermined information contained in said programmer storage medium;

means connected to said first sequence generating means for sequentially energizing each of said circuits in response to said first sequence of digital signals; and means connected to said first sequence generating means for sequentially de-energizing each of said circuits in response to the last digital signal in said first sequence of digital signals.

* * * * *